United States Patent
Kilgard

(10) Patent No.: US 8,730,253 B2
(45) Date of Patent: May 20, 2014

(54) DECOMPOSING CUBIC BEZIER SEGMENTS FOR TESSELLATION-FREE STENCIL FILLING

(75) Inventor: Mark J. Kilgard, Austin, TX (US)

(73) Assignee: NVIDIA Corporation, Santa Clara, CA (US)

(*) Notice: Subject to any disclaimer, the term of this patent is extended or adjusted under 35 U.S.C. 154(b) by 300 days.

(21) Appl. No.: 13/097,483

(22) Filed: Apr. 29, 2011

(65) Prior Publication Data

US 2011/0285720 A1    Nov. 24, 2011

Related U.S. Application Data

(60) Provisional application No. 61/347,359, filed on May 21, 2010.

(51) Int. Cl.
*G09G 5/00*          (2006.01)

(52) U.S. Cl.
USPC ............ 345/582; 345/441; 345/442; 345/468

(58) Field of Classification Search
CPC .............................. G06T 15/04; G06T 11/203
USPC .......................... 345/442, 467, 522, 584, 585
See application file for complete search history.

(56) References Cited

U.S. PATENT DOCUMENTS

| | | | |
|---|---|---|---|
| 5,731,820 A | 3/1998 | Broekhuijsen | |
| 5,774,133 A | 6/1998 | Neave et al. | |
| 5,818,459 A | 10/1998 | Kurumida | |
| 6,137,500 A | 10/2000 | Silverbrook et al. | |
| 6,201,549 B1 | 3/2001 | Bronskill | |
| 6,271,861 B1 | 8/2001 | Sargent et al. | |
| 6,295,072 B1 | 9/2001 | Pon et al. | |
| 6,384,822 B1 * | 5/2002 | Bilodeau et al. ............... 345/422 |
| 6,819,332 B2 | 11/2004 | Baldwin | |
| 7,167,181 B2 | 1/2007 | Duluk et al. | |
| 7,184,040 B1 | 2/2007 | Tzvetkov | |
| 7,355,602 B1 | 4/2008 | Kilgard et al. | |
| 7,403,208 B1 | 7/2008 | Bastos et al. | |
| 7,589,730 B1 | 9/2009 | Brown | |
| 7,684,641 B1 | 3/2010 | Toksvig | |
| 7,737,983 B2 | 6/2010 | Brothers et al. | |

(Continued)

FOREIGN PATENT DOCUMENTS

GB      2463993      4/2010

OTHER PUBLICATIONS

Benstead, Luke, et al., "Beginning OpenGL Game Programming, Second Edition," Mar. 13, 2009, Course Technology PTR, pp. 245-249.*

(Continued)

*Primary Examiner* — Hau Nguyen
*Assistant Examiner* — Ryan M Gray
(74) *Attorney, Agent, or Firm* — Patterson & Sheridan, LLP

(57) ABSTRACT

One embodiment of the present invention sets forth a technique for decomposing and filling cubic Bèzier segments of paths without tessellating the paths. Path rendering may be accelerated when a GPU or other processor is configured to perform the decomposition operations. Cubic Bèzier paths are classified and decomposed into simple cubic Bèzier path segments based on the classification. A stencil buffer is then generated that indicates pixels that are inside of the decomposed cubic Bèzier segments. The paths are then filled according to the stencil buffer to produce a filled path.

20 Claims, 17 Drawing Sheets

(56) References Cited

U.S. PATENT DOCUMENTS

| | | |
|---|---|---|
| 7,847,798 B1 | 12/2010 | Parenteau et al. |
| 7,928,984 B1 | 4/2011 | Yhann et al. |
| 8,044,955 B1 | 10/2011 | Yhann |
| 8,044,956 B1 | 10/2011 | Kilgard |
| 8,063,914 B1 | 11/2011 | Miller et al. |
| 8,072,452 B1 | 12/2011 | Brown |
| 8,264,503 B1 | 9/2012 | Parenteau et al. |
| 8,379,025 B1 | 2/2013 | Carr et al. |
| 2002/0194436 A1 | 12/2002 | McKenney et al. |
| 2003/0164842 A1 | 9/2003 | Oberoi et al. |
| 2004/0233195 A1 | 11/2004 | Bunnell |
| 2006/0232603 A1 | 10/2006 | Schuster et al. |
| 2007/0109318 A1 | 5/2007 | Tuomi |
| 2007/0211061 A1 | 9/2007 | Kokojima |
| 2008/0122866 A1 | 5/2008 | Dorbie et al. |
| 2008/0198168 A1 | 8/2008 | Jiao et al. |
| 2010/0002003 A1 | 1/2010 | Yamauchi |
| 2010/0097383 A1 | 4/2010 | Nystad et al. |
| 2010/0110093 A1* | 5/2010 | Nystad et al. ............. 345/584 |
| 2010/0149181 A1 | 6/2010 | Lee et al. |
| 2010/0185949 A1 | 7/2010 | Jaeger |
| 2010/0225660 A1 | 9/2010 | Robart |
| 2011/0090228 A1 | 4/2011 | Persson |

OTHER PUBLICATIONS

Farouki, et al. "Algebraic properties of plane offset curves", Elsevier Science Publishers B.V. (North-Holland) 1990, pp. 101-127.

Warnock, et al. "A Device Independent Graphics Imaging Model for Use with Raster Devices", Computer Graphics vol. 16, No. 3, Jul. 1982, pp. 313-319.

Loop, et al. "Resolution Independent Curve Rendering using Programmable Graphics Hardware", Association for Computing Machinery, Inc., 2005, pp. 1000-1009.

Kokojima, et al. "Resolution Independent Rendering of Deformable Vector Objects using Graphics Hardware", Toshiba Corp. (email: yoshiyuki.kokojima@toshiba.co.jp), one page, Jul. 2006.

Rueda, et al. "GPU-based rendering of curved polygons using simplicial coverings" Elsevier Computers & Graphics Journal 32, 2008 pp. 581-588.

Non-Final Office Action for U.S. Appl. No. 13/111,897 dated Jul. 29, 2013.

Non-Final Office Action for U.S. Appl. No. 13/080,948 dated Dec. 17, 2012.

Advisory Action for U.S. Appl. No. 13/109,763 dated Aug. 26, 2013.

Final Office Action for U.S. Appl. No. 13/109,763 dated Jun. 14, 2013.

Wikipedia, Blend Modes, Retrieval date: Mar. 27, 2013.

Lee, et al. "A Bezier Curve-based Approach to Shape Description for Chinese Calligraphy Characters". 2001.IEEE.

Blinn, Jim. "Jim Blinn's Corner Notation, Notation, Notation". 2003, Elsevier Inc. Chapter 16, p. 219-229.

Stone, Maureen c., DeRose, Tony D. "A Geometric Characterization of Parametric Cubic Curves". ACM Transactions on Graphics, vol. 8, No. 3, Jul. 1989, p. 147-163.

Non-Final Office Action for U.S. Appl. No. 13/098,102 dated Dec. 19, 2012.

Final Office Action for U.S. Appl. No. 13/098,102 dated Feb. 13, 2013.

Advisory Action for U.S. Appl. No. 13/098,102 dated May 21, 2013.

Non-Final Office Action for U.S. Appl. No. 13/098,102 dated Oct. 11, 2013.

Non-Final Office Action for U.S. Appl. No. 13/110,777 dated May 14, 2013.

Non-Final Office Action for U.S. Appl. No. 13/111,148 dated Jun. 4, 2013.

Non-Final Office Action for U.S. Appl. No. 13/081,325 dated Dec. 18, 2012.

Non-Final Office Action for U.S. Appl. No. 13/098,147 dated Dec. 19, 2012.

Final Office Action for U.S. Appl. No. 13/098,147 dated Apr. 18, 2013.

Non-Final Office Action for U.S. Appl. No. 13/112,874 dated Apr. 8, 2013.

Final Office Action for U.S. Appl. No. 13/112,874 dated Aug. 1, 2013.

Advisory Action for U.S. Appl. No. 13/112,874 dated Oct. 10, 2013.

Non-Final Office Action for U.S. Appl. No. 13/109,763 dated Mar. 4, 2013.

Non-Final Office Action for U.S. Appl. No. 13/100,938 dated Nov. 7, 2013.

* cited by examiner

PRIOR ART

DECOMPOSING CUBIC BEZIER SEGMENTS FOR TESSELLATION-FREE STENCIL FILLING

CROSS-REFERENCE TO RELATED APPLICATIONS

This application claims priority benefit to U.S. provisional patent application titled, "Path Rendering," filed on May 21, 2010 and having Ser. No. 61/347,359. This related application is also hereby incorporated by reference in its entirety.

BACKGROUND OF THE INVENTION

1. Field of the Invention

The present invention generally relates to graphics processing and more specifically to decomposing cubic Bèzier segments for tessellation-free stencil filling.

2. Description of the Related Art

Path rendering is a style of resolution-independent two-dimensional (2D) rendering, often called "vector graphics," that is the basis for a number of important rendering standards such as PostScript, Java 2D, Apple's Quartz 2D, OpenVG, PDF, TrueType fonts, OpenType fonts, PostScript fonts, Scalable Vector Graphics (SVG) web format, Microsoft's Silverlight and Adobe Flash for interactive web experiences, Open XML Paper Specification (OpenXPS), drawings in Office file formats including PowerPoint, Adobe Illustrator illustrations, and more.

Path rendering is resolution-independent meaning that a scene is described by paths without regard to the pixel resolution of the framebuffer. This is in contrast to the resolution-dependent nature of so-called bitmapped graphics. Whereas bitmapped images exhibit blurred or pixilated appearance when zoomed or otherwise transformed, scenes specified with path rendering can be rendered at different resolutions or otherwise transformed without blurring the boundaries of filled or stroked paths.

Sometimes the term vector graphics is used to mean path rendering, but path rendering is a more specific approach to computer graphics. While vector graphics could be any computer graphics approach that represents objects (typically 2D) in a resolution-independent way, path rendering is a much more specific rendering model with salient features that include path filling, path stroking, dashing, path masking, compositing, and path segments specified as Bèzier curves.

FIG. 1A is a prior art scene composed of a sequence of paths. In path rendering, a 2D picture or scene such as that shown in FIG. 1A is specified as a sequence of paths. Each path is specified by a sequence of path commands and a corresponding set of scalar coordinates. Path rendering is analogous to how an artist draws with pens and brushes. A path is a collection of sub-paths. Each sub-path (also called a trajectory) is a connected sequence of line segments and/or curved segments. Each sub-path may be closed, meaning the sub-path's start and terminal points are the same location so the stroke forms a loop; alternatively, a sub-path can be open, meaning the sub-path's start and terminal points are distinct.

When rendering a particular path, the path may be filled, stroked, or both. As shown in FIG. 1A, the paths constituting the scene are stroked. When a path is both filled and stroked, typically the stroking operation is done immediately subsequent to the filling operation so the stroking outlines the filled region. Artists tend to use stroking and filling together in this way to help highlight or offset the filled region so typically the stroking is done with a different color than the filling.

FIG. 1B is the sequence of paths shown in FIG. 1A with only filling. Filling is the process of coloring or painting the set of pixels "inside" the closed sub-paths of a path. Filling is similar to the way a child would "color in between the lines" of a coloring book. If a sub-path within a path is not closed when such a sub-path is filled, the standard practice is to force the sub-path closed by connecting its end and start points with an implicit line segment, thereby closing the sub-path, and then filling that resulting closed path.

While the meaning of "inside a path" generally matches the intuitive meaning of this phrase, path rendering formalizes this notion with what is called a fill-rule. The intuitive sense of "inside" is sufficient as long as a closed sub-path does not self-intersect itself. However if a sub-path intersects itself or another sub-path or some sub-paths are fully contained within other sub-paths, what it means to be inside or outside the path needs to be better specified.

Stroking is distinct from filling and is more analogous to tracing or outlining each sub-path in a path as if with a pen or marker. Stroking operates on the perimeter or boundary defined by the path whereas filling operates on the path's interior. Unlike filling, there is no requirement for the sub-paths within a path to be closed for stroking. For example, the curve of a letter "S" could be stroked without having to be closed though the curve of the letter "O" could also be stroked.

FIG. 1C is a prior art scene composed of the sequence of paths from FIG. 1A with the stroking from FIG. 1A and the filling from FIG. 1B. FIG. 1C shows how filling and stroking are typically combined in a path rendering scene for a complete the scene. Both stroking and filling are integral to the scene's appearance.

Traditionally, graphics processing units (GPUs) have included features to accelerate 2D bitmapped graphics and three-dimensional (3D) graphics. In today's systems, nearly all path rendering is performed by a central processing unit (CPU) performing scan-line rendering with no acceleration by a GPU. GPUs do not directly render curved primitives so path rendering primitives such as Bèzier segments and partial elliptical arcs must be approximated by lots of tiny triangles when a GPU is used to render the paths. Constructing the required tessellations of path approximated by lots of short connected line segments can create a substantial CPU burden. The triangles or other polygons resulting from tessellation are then rendered by the GPU. Because GPUs are so fast at rasterizing triangles, tessellating paths into polygons that can then be rendered by GPUs is an obvious approach to GPU-accelerating path rendering.

Tessellation is a fragile, often quite sequential, process that requires global inspection of the entire path. Tessellation depends on dynamic data structures to sort, search, and otherwise juggle the incremental steps involved in generating a tessellation. Path rendering makes this process considerably harder by permitting curved path segments as well as allowing path segments to self-intersect, form high genus topologies, and be unbounded in size.

A general problem with using a GPU to render paths is unacceptably poor antialiasing quality when compared to standard CPU-based methods. The problem is that GPUs rely on point sampling for rasterization of triangular primitives with only 1 to 8 samples (often 4) per pixel. CPU-based scan-line methods typically rely on 16 or more samples per pixel and can accumulate coverage over horizontal spans.

Animating or editing paths is costly because it requires re-tessellating the entire path since the tessellation is resolution dependent, and in general it is very difficult to prove a local edit to a path will not cause a global change in the tessellation of the path. Furthermore, when curved path segments are present and the scaling of the path with respect to pixel space changes appreciably (zooming in say), the curved path segments may need to be re-subdivided and re-tessellation is likely to be necessary.

Additionally, compositing in path rendering systems typically requires that pixels rasterized by a filled or stroked path are updated once-and-only-once per rasterization of the path. This requirement means non-overlapping tessellations are required. So for example, a cross cannot be tessellated as two overlapping rectangles but rather must be rendered by the outline of the cross, introducing additional vertices and primitives. In particular, this means the sub-paths of a path cannot be processed separately without first determining that no two sub-paths overlap. These requirements, combined with the generally fragile and sequential nature of tessellation algorithms make path tessellation particularly expensive. Because of the expense required in generating tessellations, it is very tempting and pragmatic to cache tessellations. Unfortunately such tessellations are much less compact than the original path representations, particularly when curved path segments are involved. Consequently, a greater amount of data must be stored to cache paths after tessellation compared with storing the paths prior to tessellation. Such cached tessellations are ineffective when paths are animated or rendered just once.

Accordingly, what is needed in the art is a robust and efficient system and method for decomposing and filling cubic Bèzier segments of paths without tessellating the paths. Today path filling algorithms execute on the CPU and are typically implemented in the context of a scan-line rasterizer; these algorithms do not benefit from the efficient execution model of the GPU. Tessellating filled paths into triangles for GPU rendering is unattractive for the reasons previously outlined. A technique developed by Charles Loop and Jim Blinn (described in Resolution Independent Curve Rendering using Programmable Graphics Hardware, *ACM Transactions on Graphics*, Volume 24, Issue 3, July 2005) provide an implicit form for cubic Bèzier curves suitable for efficient evaluation by pixel shaders, but the technique requires the interior of the cubic Bèzier curves to be tessellated into triangles. Other conventional techniques fill paths without tessellation by rendering concave polygons constructed of line segments that are not curved using a stencil buffer. Kokojima et al. (in Resolution Independent Rendering of Deformable Vector Objects using Graphics Hardware, *ACM SIGGRAPH* 2006 Sketches) describe a tessellation-free approach to filling paths including quadratic Bèzier path segments. However, the approach described by Kokojima et al. is limited to quadratic Bèzier curves and thereby avoid the technical difficulties created by the topological complexity of cubic Bèzier curves. Rueda et.al. (in GPU-based rendering of curved polygons using simplicial coverings. *Computers and Graphics*, Volume 32, Issue 5, October 2008, pages 581-588.) propose a tessellation-free approach capable of handling cubic Bèzier curves. However, their technique requires Bèzier normalization that results in many times more arithmetic operations per Bèzier curve tested against a point compared with the implicit form of the Bèzier curve developed by Loop and Blinn. Therefore the present invention develops a method and system for decomposing and filling cubic Bèzier segments of paths that is robust in the face of topological variety of cubic Bèzier curves, inexpensive to evaluate using a programmable GPU, and does not tessellate the interior of the curve, i.e., is free of tessellation.

SUMMARY OF THE INVENTION

One embodiment of the present invention sets forth a technique for decomposing and filling cubic Bèzier segments of paths without tessellating the paths. Path rendering may be accelerated when a GPU or other processor that is configured to perform the decomposition operations. Cubic Bèzier paths are classified and decomposed into simple cubic Bèzier path segments based on the classification. A stencil buffer is then generated that indicates pixels that are inside of the decomposed cubic Bèzier segments. The paths are then filled according to the stencil buffer to produce a filled path.

Various embodiments of a method of the invention for decomposing cubic Bèzier segments for tessellation-free stencil filling include receiving a path including a cubic Bèzier path segment and subdividing the cubic Bèzier path segment into simple cubic Bèzier path segments when the cubic Bèzier path segment is classified as having a serpentine or loop topology. Texture map coordinates are assigned to vertices of the simple cubic Bèzier path segments that define a convex hull geometry and a stencil buffer indicating pixels that are inside of the cubic Bèzier path segment is generated by processing the texture map coordinates.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
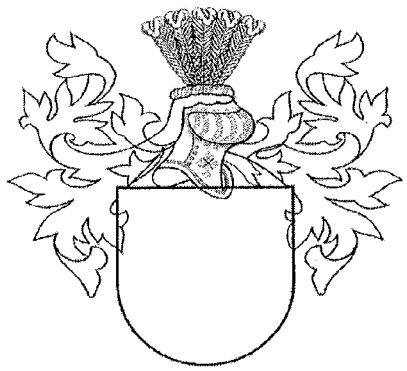
FIG. 1A is a prior art scene composed of a sequence of paths.
Figure 1B:
FIG. 1B is the fill for the prior art scene shown in FIG. 1A.
Figure 1C:
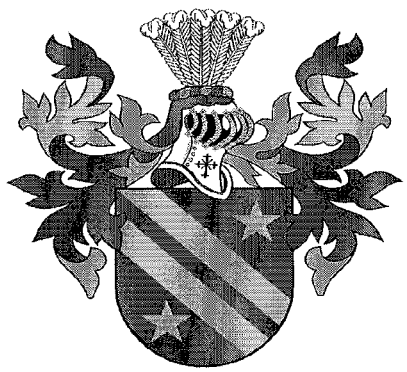
FIG. 1C is the prior art scene of FIG. 1A with the fill of FIG. 1B and the stroked sequence of paths.
Figure 2A:
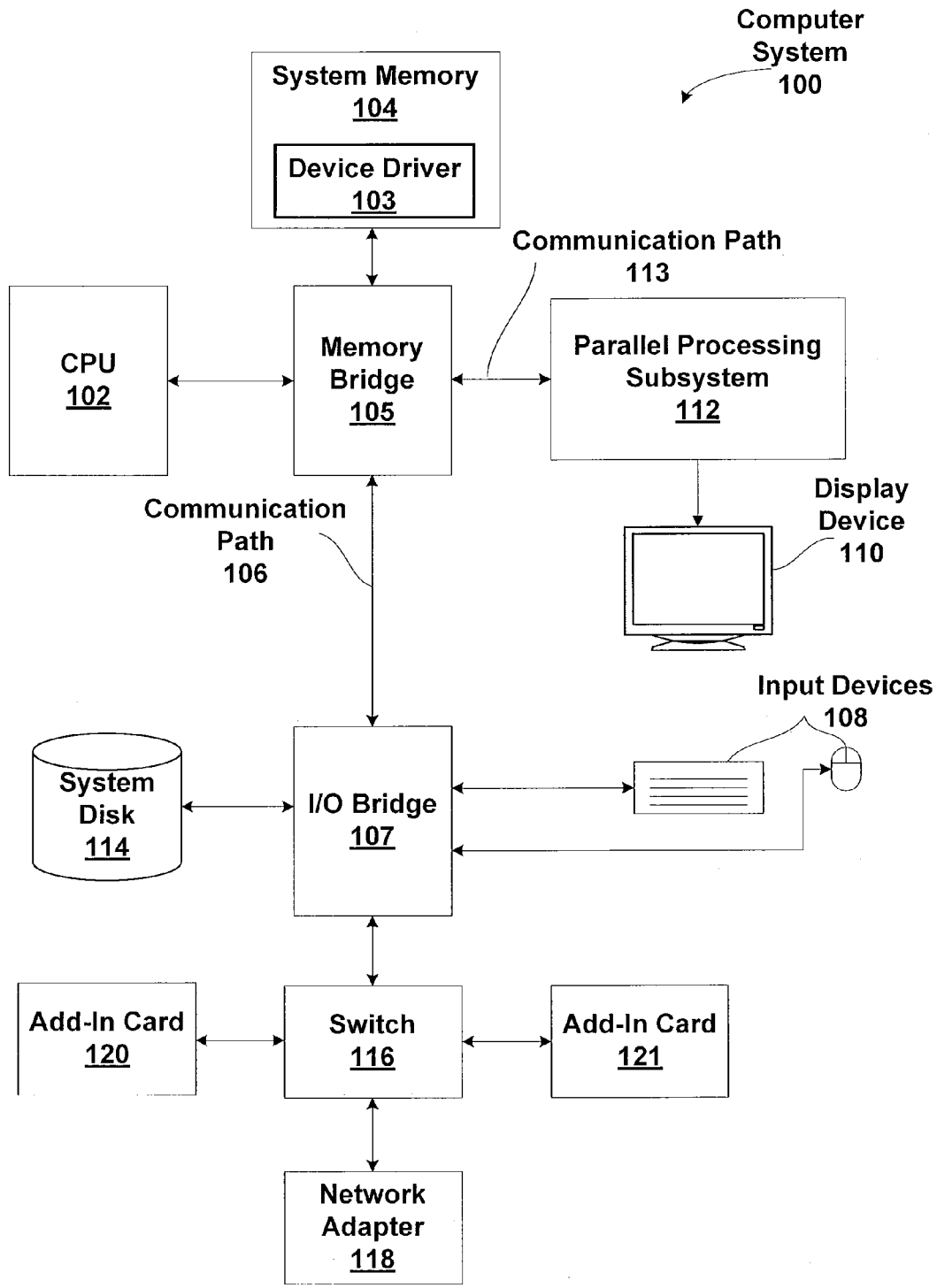
FIG. 2A is a block diagram illustrating a computer system configured to implement one or more aspects of the present invention.

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
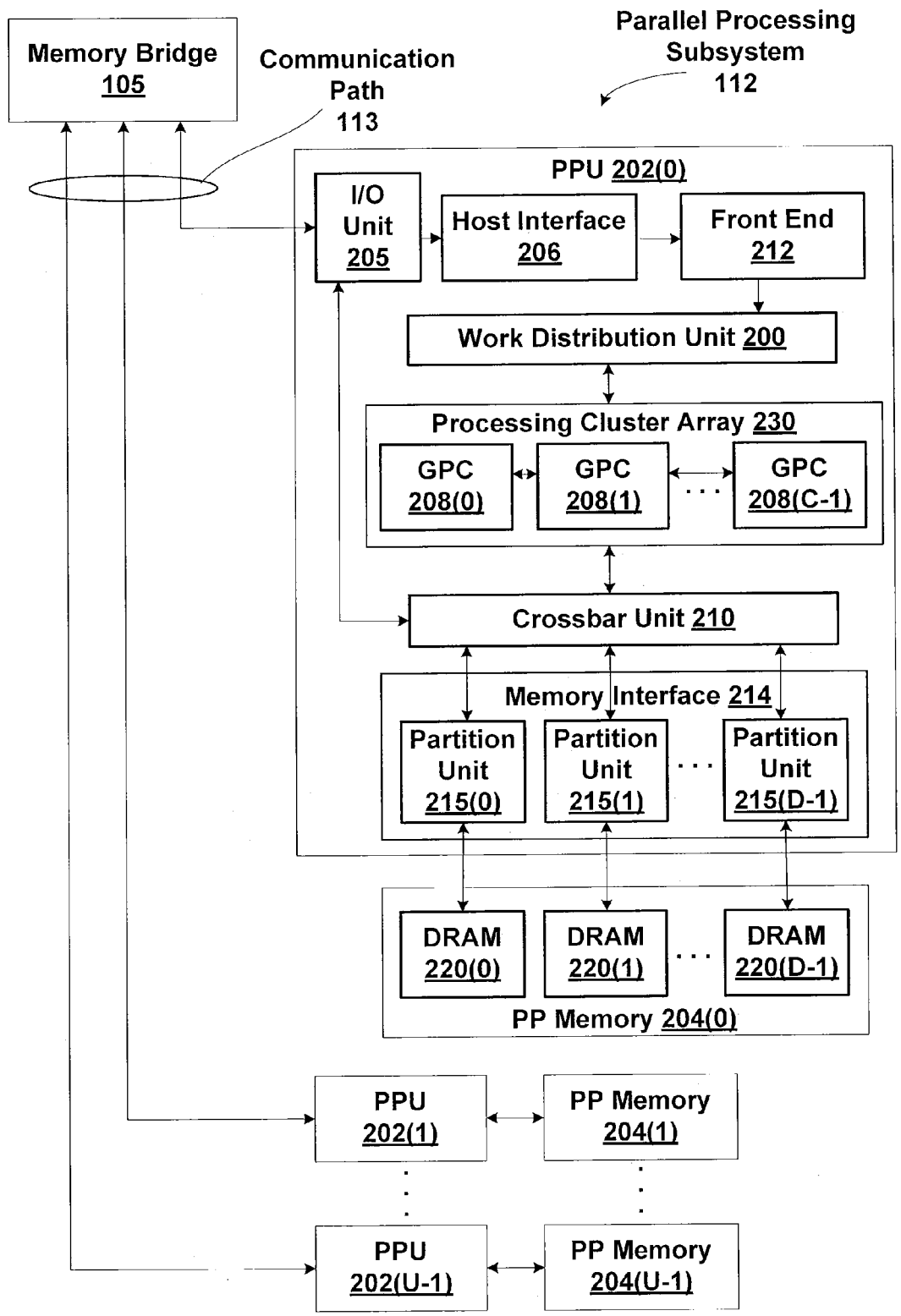
FIG. 2B is a block diagram of a parallel processing subsystem for the computer system of FIG. 2A, according to one embodiment of the present invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 2A or FIG. 2B) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip.

PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
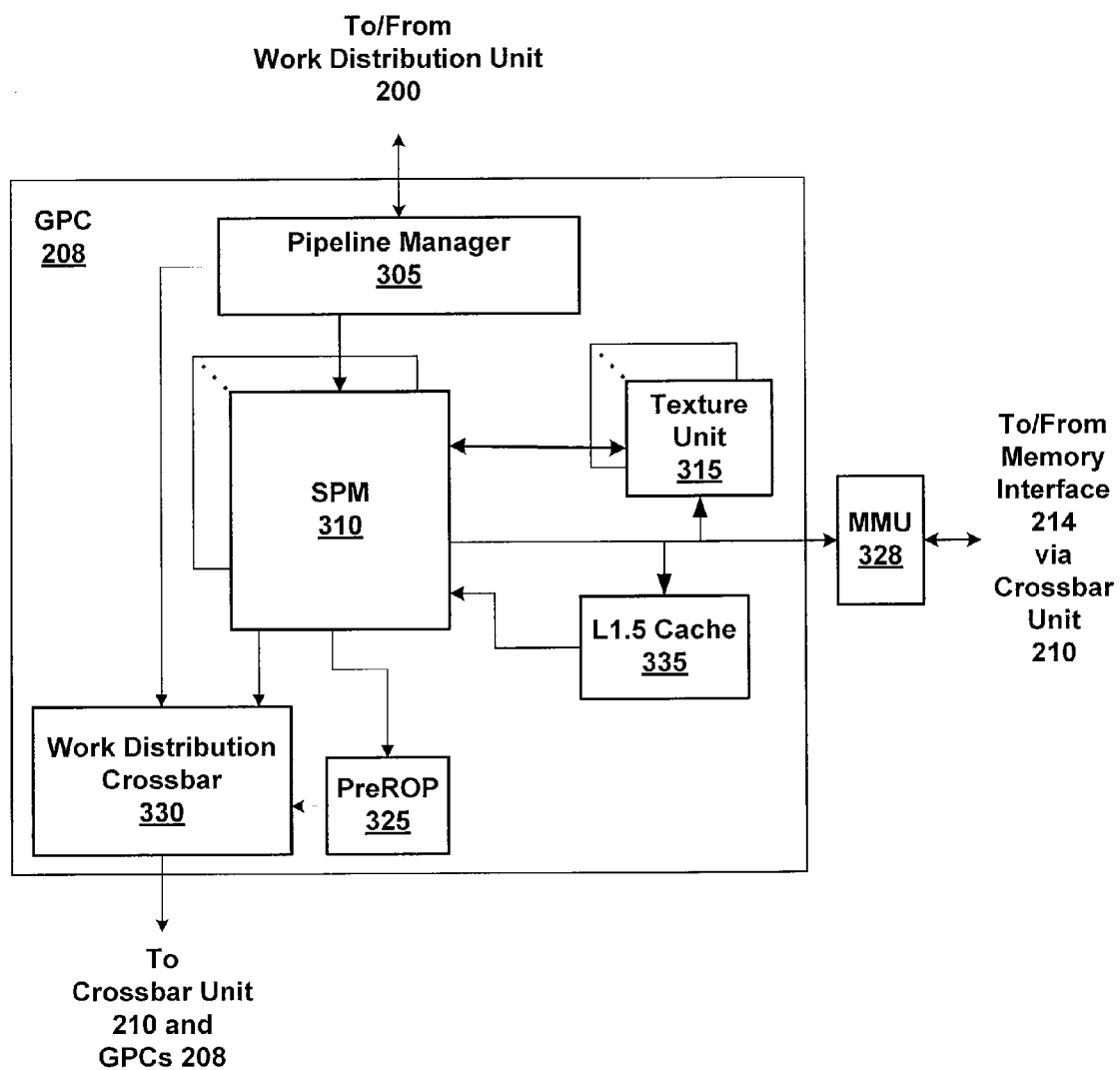
FIG. 3A is a block diagram of a GPC within one of the PPUs of FIG. 2B, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
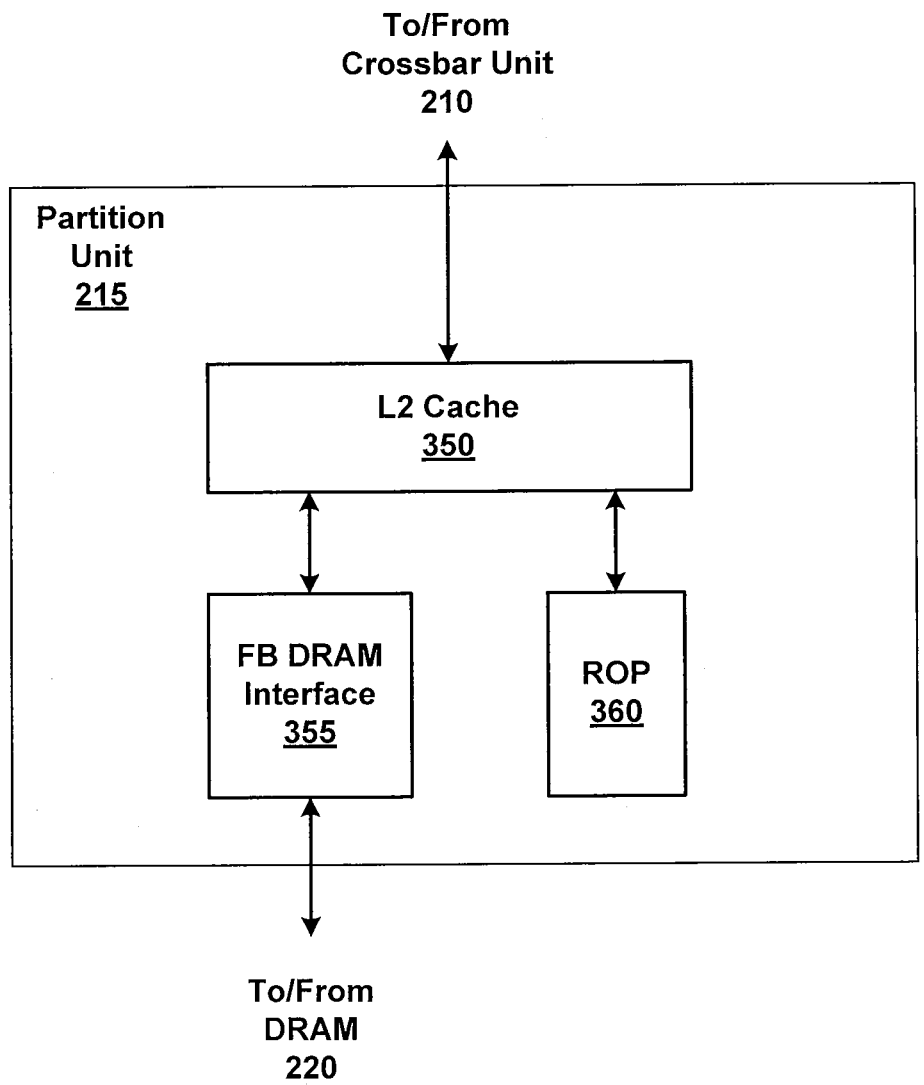
FIG. 3B is a block diagram of a partition unit within one of the PPUs of FIG. 2B, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
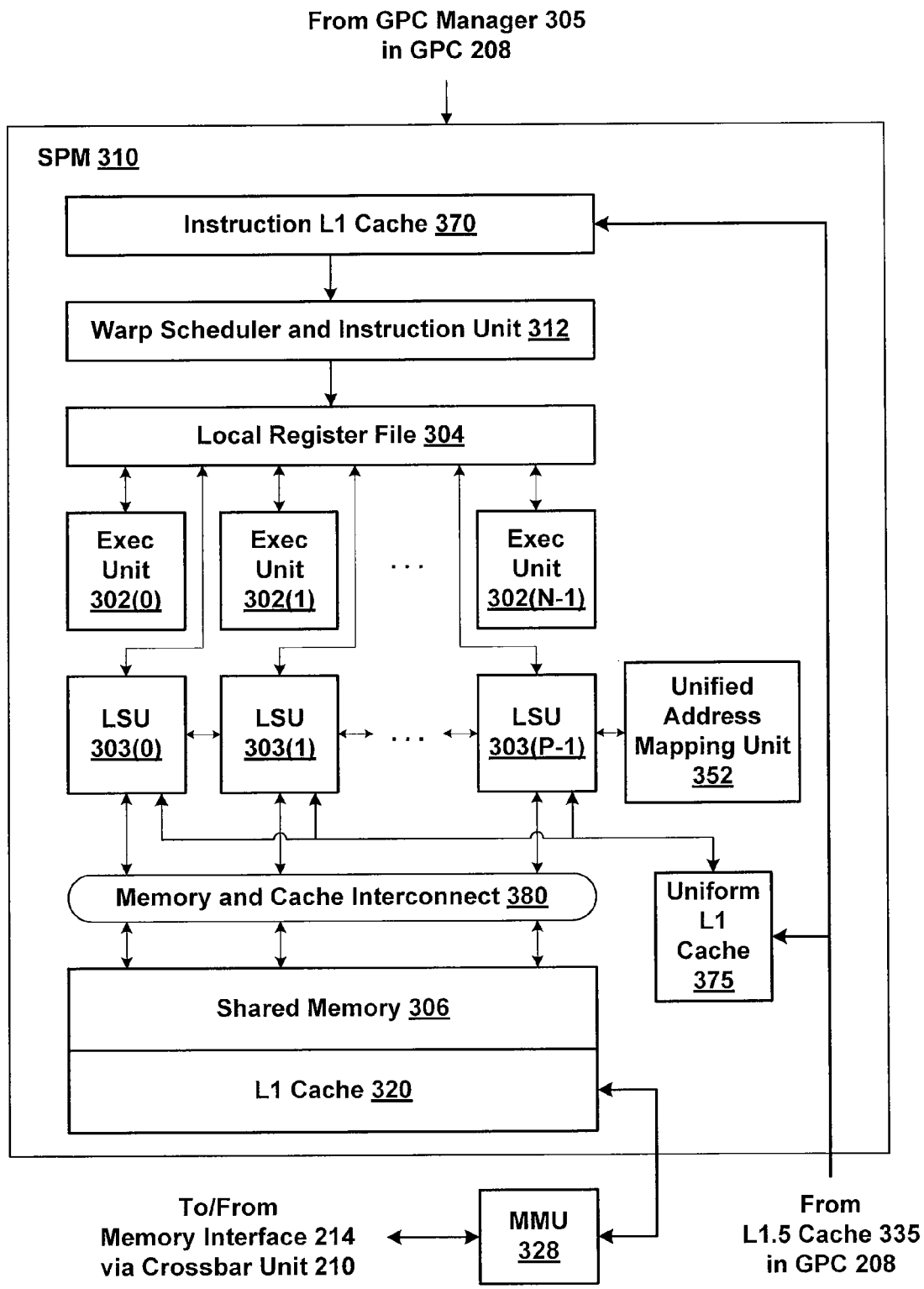
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
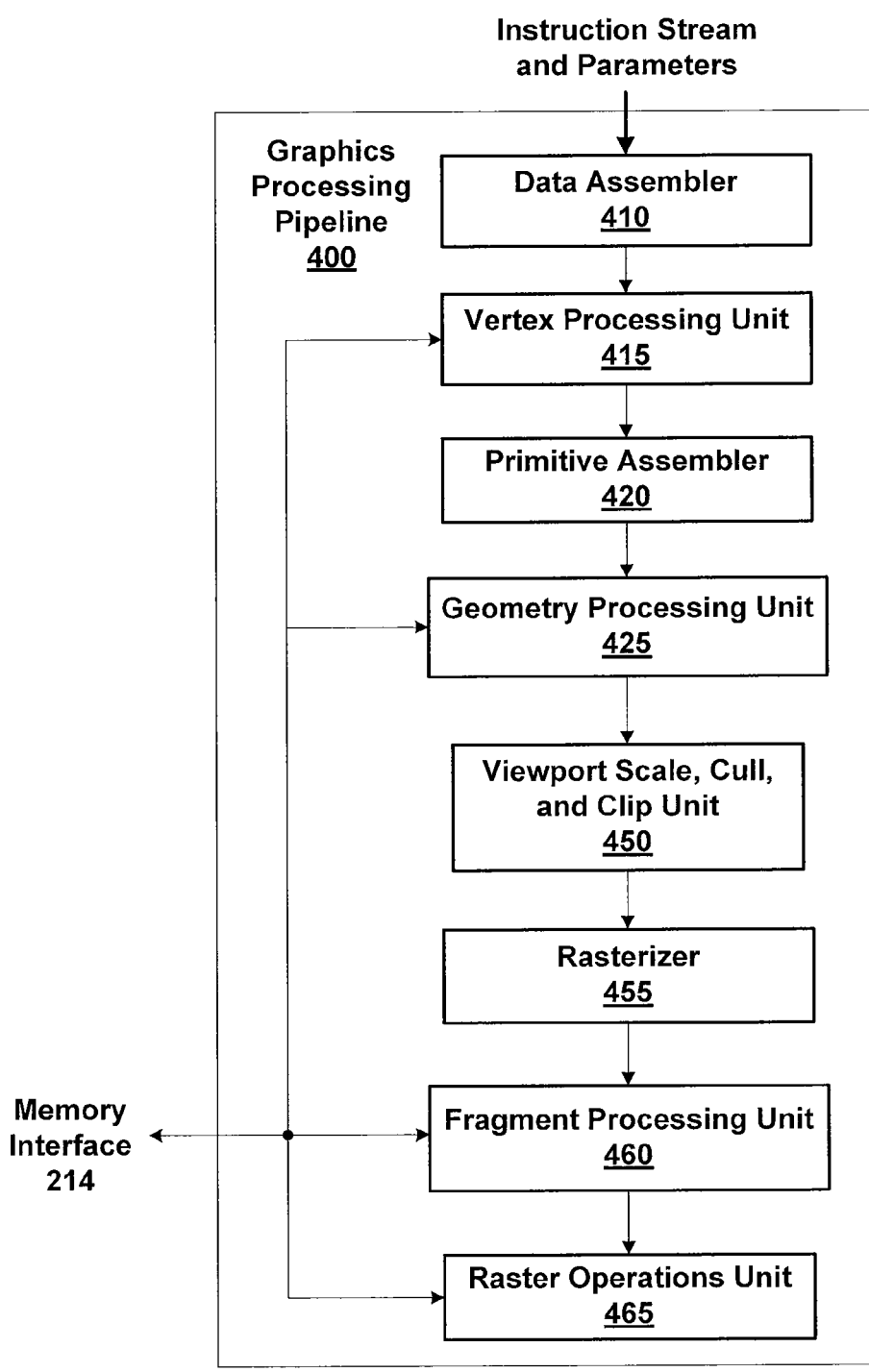
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Decomposing Cubic Bèzier Segments

A path consists of a sequence of connected path segment commands for line segments, Bèzier segments, and partial elliptical arcs. Cubic Bèzier segments pose a particular challenge when rendering these segments into the stencil buffer to determine what framebuffer sample locations are within the filled region of the respective path. If not done carefully, multiple classes of cubic Bèzier segments can contribute incorrect winding number offsets to the net winding number for a particular framebuffer sample location. An incorrect winding number determination immediately leads to an incorrect determination of the rasterized filled region of said path. Decomposing each arbitrary cubic Bèzier in a path into one or more simple cubic Bèzier segments produces a geometry set that is suitable for rendering filled paths containing cubic Bèzier segments. Such decomposition is beneficial because it results in a robust determination of the filled region of a rendered path without tessellating the path. The path is divided into cubic Bèzier path segments that are each classified and further divided into simple cubic Bèzier path segments. Care must be taken to preserve the proper vertex winding order of each simple Bèzier cubic segment, split the original cubic Bèzier at the proper positions, and linearly interpolate texture coordinates according to the technique described by Loop and Blinn for use with a discard shader. The simple cubic Bèzier path segments are then rasterized using a discard shader program to generate a stencil buffer indicating pixels that are inside of the path. In contrast, the discard shader technique described by Loop and Blinn fills the inside of the path by rendering the tessellated Bèzier curve segments using the discard shader to write directly to the color buffer.

Bèzier curves are defined by their control points. In the 2D content of path rendering, each control point is a 2D position. Curved path segments for a path may be generated by path commands for quadratic Bèzier curves, cubic Bèzier curves, and partial elliptical arcs.

A quadratic Bèzier curve is specified by 3 control points and a cubic Bèzier curve is specified by 4 control points. The QUADRATICTO command uses the terminal position of the prior command as its initial control point (x0,y0) and then 4 associated coordinates form the two new (x1,y1) and (x2,y2) control points. The quadratic Bèzier curve starts at (x0,y0) heading towards (x1,y1) and ends at (x2,y2) as if coming from (x1,y1). Despite (x1,y1) providing the initial tangent direction when starting from (x0,y0) and terminating at (x2,y2), the resulting curve does not pass through (x1,y1); for this reason, (x1, y1) is known as an extrapolating control point while (x0,y0) and (x2,y2) are known as interpolating control points. Quadratic Bèzier curves may be filled without tessellation manner, because non-degenerate quadratic Bèzier curves have no points of self-intersection and the segment curve does not intersect the line formed by the initial and terminal control points.

The CUBICTO command is similar to the QUADRATICTO command but generates a cubic Bèzier curve. Such a curve is specified by 4 control points. The CUBICTO command uses the terminal position of the prior command as its initial control point (x0,y0) and then 6 associated coordinates form the 3 new (x1,y1), (x2,y2), and (x3,y3) control points. The cubic Bèzier curve starts at (x0,y0) heading towards (x1,y1) and ends at (x3,y3) as if coming from (x2,y2). While a quadratic Bèzier curve has a single extrapolating control point, cubic Bèzier curves have two extrapolating control points, (x1,y1) and (x2,y2). A cubic Bèzier curve has the freedom, unlike a quadratic Bèzier curve, to specify arbitrary initial and terminal tangent directions for its end-points. This control makes cubic Bèzier curves popular with artists. This additional control comes from the curve being described by a third-order polynomial equation instead of a second-order equation in the case of a quadratic Bèzier curve (and first-order in the case of line segments). This additional polynomial degree provides the requisite freedom for a cubic Bèzier segment to non-trivially self-intersect itself or cross the line formed by the segment's initial and terminal control points. These conditions result in reversals of the local sense of "inside" and "outside" the path. In order for a tessellation-free path filling approach based on stencil counting of rasterized polygons to be robust when a discard shader is used to write a stencil buffer, such situations must be avoided. The present invention describes such an approach that preserves the efficiency of evaluating the implicit representation of cubic Bèzier segments described by Loop and Blinn is used by a discard shader to write the stencil buffer.

Figure 5A:
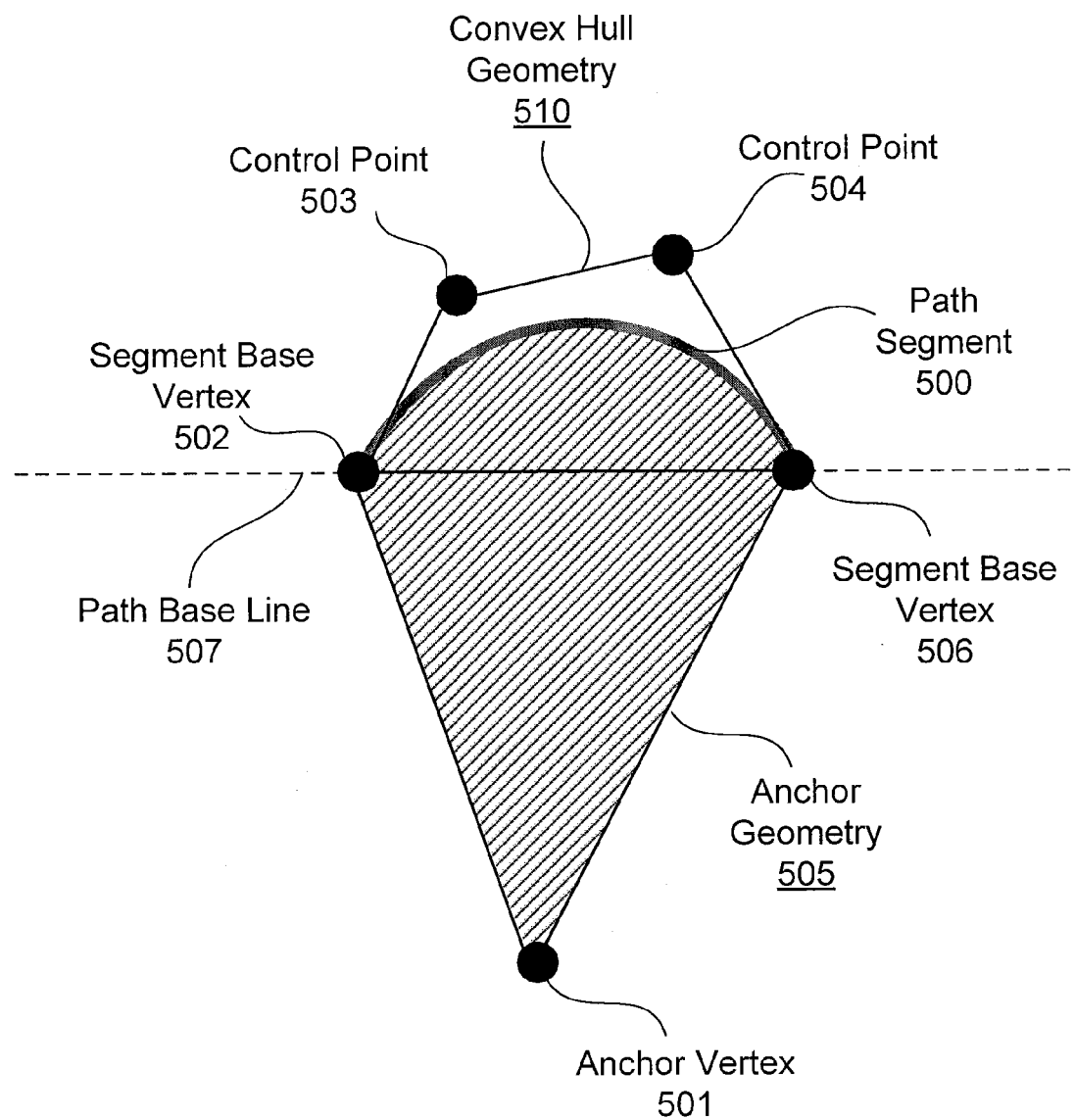
FIGS. 5A, 5B, 5C, and 5D illustrate paths that are simple Bèzier cubic path segments, according to one embodiment of the invention.

FIG. 5A illustrates a simple cubic Bèzier path segment 500 of a path, according to one embodiment of the invention. The simple cubic Bèzier path segment 500 may be one of many segments that define a closed path loop. The simple cubic Bèzier path segment 500 starts at a first interpolating control point, segment base vertex 502 and ends at a second interpolating control point, segment base vertex 506. The simple cubic Bèzier path segment 500 has two extrapolating control points, control point 503 and control point 504. Parameters for the simple cubic Bèzier path segment 500 are generated by linearly interpolating parameters that specify the cubic Bèzier path segment from which the simple cubic Bèzier path segment 500 originated. A polygon, convex hull geometry 510 is constructed for the simple cubic Bèzier path segment 500 such that each vertex of the convex hull geometry 510 is coincident with a control point of the simple cubic Bèzier path segment 500. The 4-sided convex hull geometry 510 is defined by the segment base vertex 502, control point 503, control point 504, and segment base vertex 506 and has a winding order that is clockwise because the convex hull geometry 510 is front-facing.

An anchor vertex 501 is determined for the closed path loop (potentially a sub-path of the complete path containing multiple such path loops) containing the simple cubic Bèzier path segment 500. For clarity of illustration, FIG. 5A shows just a single path segment and not the closed loop within which the segments is a part. This loop would consist of one or more additional path segments looping from segment base vertex 506 and eventually connecting back to segment base vertex 502. Anchor geometry 505 is a triangle defined by the anchor vertex 501, segment base vertex 502, and segment base vertex 506 has a winding order that is consistent with the path segment 500. The winding order of the anchor geometry 505 is clockwise because the anchor geometry 505 is front-facing.

The anchor vertex 501 may be located anywhere within the 2D plane containing the path containing path segment 500. What matters is that every path segment residing on the path loop containing path segment 500 share the same anchor vertex. This shared anchor vertex for all the loop's path segments ensures the winding number counting performed through a rasterization process has a consistent neutral position from which to rasterize and count. A good choice for the anchor vertex location is any segment base vertex (such as 502 or 506) because that forces at least one anchor geometry triangle to be zero area such that it need not be rasterized. Additionally choosing an anchor vertex near the centroid of the closed path's filled region tends to minimize the overall rasterization processing.

A set of stencil values in a stencil buffer may be generated that indicates the pixels, or more generally framebuffer sample locations, that are within the path segment 500 by incrementing each stencil buffer value corresponding to pixels that are within the front-facing hull geometry 510 and incrementing each stencil buffer value corresponding to pixels that are within the front-facing anchor geometry 505. Likewise, if the hull geometry or anchor geometry was back-facing, the rasterization process would decrement each stencil buffer value corresponding to pixels within said geometry.

When rendering the hull and anchor geometry, the vertices belonging to this geometry are subject to an arbitrary projective transformation so the sense of front- or back-facing in object space may be the opposite sense after vertex transformation. In one embodiment, the ROP 360 (alternatively raster operations unit 465) performs the increments and decrements of stencil while the rasterizer 455 rasterizes the geometry.

In one embodiment, batches of hull geometry and anchor geometry are drawn together that mix front- and back-facing polygons such that two-sided stencil testing can increment and decrement the stencil based on each polygon's determined facingness. The color and depth writes are disabled during generation of the stencil buffer. Once the stencil buffer is complete, writes to the color buffer are enabled and the pixels that are inside of the path may be filled by using the stencil buffer to write the color buffer when a conservative bounding geometry that encloses a closed path including the path segment 500 is rendered. During this second rendering pass to cover the path, the stencil values can be restored to their value prior to writing of the stencil buffer in the first rendering pass.

In order to fill only the portion of the hull geometry 510 that is inside of the path segment 500 (indicated by the fill pattern), values of the stencil buffer corresponding to the pixels that are located in the portion of the hull geometry 510 that is between the path segment 500 and the edges of the hull geometry 510 defined by segment base vertex 502, control point 503, control point 504, and the segment base vertex 506 should not be incremented or decremented. In other words, pixels within the hull geometry 510 and outside of the path segment 500 should be disabled. The parameters defining the path segment 500 may be linearly interpolated as texture map coordinates for each pixel within the hull geometry 510. The interpolated texture coordinates for each pixel may then be used to determine whether the pixel is inside the path segment 500. The technique of calculating texture coordinates to determine whether a pixel is inside of a path segment is described by Charles Loop and Jim Blinn (in Resolution Independent Curve Rendering using Programmable Graphics Hardware, *ACM Transactions on Graphics*, Volume 24, Issue 3, July 2005) and is summarized here.

Simple cubic and quadratic Bèzier segments may be processed by a fragment shader program to determine if each fragment or sample is inside or outside of the path segment 500. Rendering quadratic Bèzier path segments in this manner is straightforward. The shader program evaluates the following boolean expression depending on two texture coordinates (s,t):

$$Q(s,t)=s^2>t$$

If Q(s,t) is true, the sample should be discarded; otherwise the sample is within the quadratic Bèzier path segment and should be rendered.

Rendering cubic Bèzier path segments is more complex. The fragment shader program evaluates the following boolean expression depending on three texture coordinates (s,t,r):

$$C(s,t,r)=s^3>tr$$

If C(s,t,r) is true, the sample should be discarded; otherwise the sample is within the cubic Bèzier path segment 500 and should be rendered. Computing the texture coordinates needed for the cubic Bèzier path segment 500 involves classifying the topology of the path (serpentine, cusp, loop, or a degenerate quadratic, line, or point).

The technique described by Loop and Blinn assumes that the interior of paths has been tessellated so that Bèzier path segments lie only on the boundary of the path. As previously explained, tessellation is burdensome in terms of both performance and the amount of data that is generated. In order to avoid tessellation of the interior of the path, a new technique is used that characterizes the topology of the cubic Bèzier path segments and divides the cubic Bèzier path segments into simple cubic Bèzier path segments based on the characterization of each cubic Bèzier path segment. The efficient discard shader technique developed by Loop and Blinn is used to remove pixels that are outside of the simple cubic Bèzier path segments. In contrast with the new technique and the discard shader technique, Rueda et al. describe a technique that relies on a less efficient cubic Bèzier normalization requiring many more arithmetic operations for each cubic Bèzier curve that is tested against a pixel.

Texture coordinates are associated with the vertices of the anchor triangles and the texture coordinates are interpolated and used by a discard shader program to determine the pixels of the convex hull geometry 510 that are inside of the path segment 500. The discard shader program first discards any pixels that are outside of the path segment 500 based on the interpolated texture coordinates and then increments or decrements the stencil buffer values corresponding to the surviving pixels based on the winding order of the convex hull geometry 510. In one embodiment, stencil values are incremented for front-facing (clockwise winding) primitives and decremented for back-facing (counter-clockwise winding) primitives. In another embodiment, stencil values are decremented for front-facing (clockwise winding) primitives and incremented for back-facing (counter-clockwise winding) primitives. In yet another embodiment, the convention for front-facing is counter-clockwise while back-facing is clockwise. Writes to the color and depth buffer are disabled during execution of the discard shader.

A stencil shader is executed to render the anchor geometry 505 and, based on the winding order of the anchor geometry 505, values in the stencil buffer are incremented or decremented for pixels that are within the anchor geometry 505. The winding order of 505 is such that the direction of winding from 502 to 506 is the opposite direction as used for the convex hull geometry 510. In the FIG. 5A example, the convex hull geometry 510 winds clockwise from vertices 503 to 504 to 506 to 502. So the winding for anchor geometry 505 must wind 501 to 502 to 506 (opposite of 506 to 502). Writes to the color and depth buffer are disabled during execution of the stencil shader. The stencil shader may be executed before or after the discard shader.

After the stencil buffer is updated for all of the path segments of a path, the resulting stencil buffer indicates the pixels that are inside of the closed path that includes the path segment 500. Writes to the color buffer are enabled and a fill shader program is then executed to fill the inside of the closed path using the generated stencil buffer while rendering a bounding geometry. The stencil buffer may be cleared for each pixel as a fill color is written to the color buffer for the respective pixel. Clearing the stencil value of each pixel is straightforward to accomplish with standard stencil operations such as Zero or Replace. The bounding geometry may be a set of polygons, including a polygon defined by all of the vertices of both the convex hull geometry 510 and anchor geometry 505. Alternatively, the bounding geometry may be a single polygon that encloses the entire closed path to be filled. The bounding geometry should conservatively enclose the path to be filled.

Figure 5B:
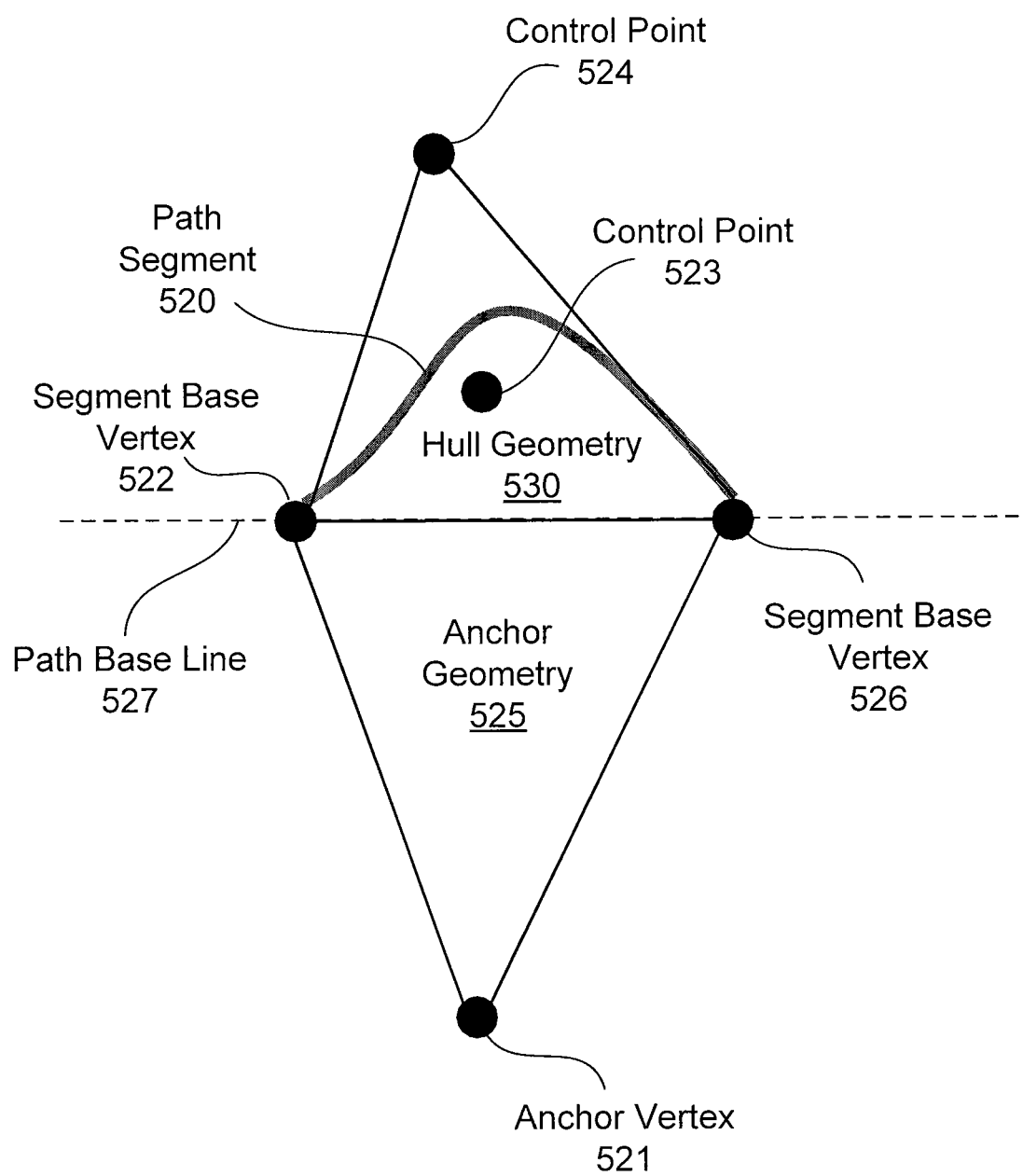

FIG. 5B illustrates another path segment 520 that is also a simple Bèzier cubic path segment, according to one embodiment of the invention. The simple cubic Bèzier path segment 520 starts at a first interpolating control point, segment base vertex 522 and ends at a second interpolating control point, segment base vertex 526. The simple cubic Bèzier path segment 520 has two extrapolating control points, control point 523 and control point 524. Note that the control point 523 is inside of the path segment 520.

Parameters for the simple cubic Bèzier path segment 520 are generated by linearly interpolating parameters that specify the cubic Bèzier path segment from which the simple cubic Bèzier path segment 520 originated. A polygon, convex hull geometry 530 is constructed for the simple cubic Bèzier path segment 520 such that each vertex of the convex hull geometry 530 is coincident with a control point of the simple cubic Bèzier path segment 520. The 3-sided convex hull geometry 530 is defined by the segment base vertex 522, control point 524, and segment base vertex 526 and is front-facing. An anchor vertex 521 is determined for the closed path loop containing the simple cubic Bèzier path segment 520 and an anchor geometry 525 (triangle) is defined by the anchor vertex 521, the segment base vertex 526, and the segment base vertex 522. The anchor geometry 525 is also front-facing.

Texture coordinates are associated with the vertices of the anchor triangles and the texture coordinates are interpolated and used by the discard shader program to determine the pixels of the convex hull geometry 530 that are inside of the path segment 520. The discard shader program first discards any pixels that are outside of the path segment 520 based on the interpolated texture coordinates and then updates the stencil buffer values corresponding to the surviving pixels based on the winding order of the convex hull geometry 530. The anchor geometry 525 is also rasterized though without requiring texture coordinates and without a discard shader so that, based on the winding order of the anchor geometry 525, values in the stencil buffer are updated for pixels that are within the anchor geometry 525. Writes to the color and depth buffer are disabled during execution of the discard shader and the stencil shader. In one embodiment, anchor polygons rasterize at a faster rate than shaded polygons, often double the peak rate for shaded polygons, because no attributes need to be interpolated, no shader execution need be initiated, and no color writes are necessary. This faster rate of stencil-only, shader-free rasterization for anchor polygons is advantageous because anchor polygons tend to perform more stencil updates overall compared to the hull geometry that is processed by discard shaders.

After the stencil buffer is updated for all of the path segments of a path, the resulting stencil buffer indicates the pixels that are inside of the closed path that includes the path segment 520. A fill shader program is then executed by rasterizing one or more polygons conservatively covering the path to fill the inside of the closed path using the generated stencil buffer. During this rasterization, the color buffer is updated for pixels indicated by the stencil buffer to be within the fill of the path; additionally stencil operations can restore the stencil buffer to its state prior to rasterizing the path's fill into the stencil buffer.

Figure 5C:
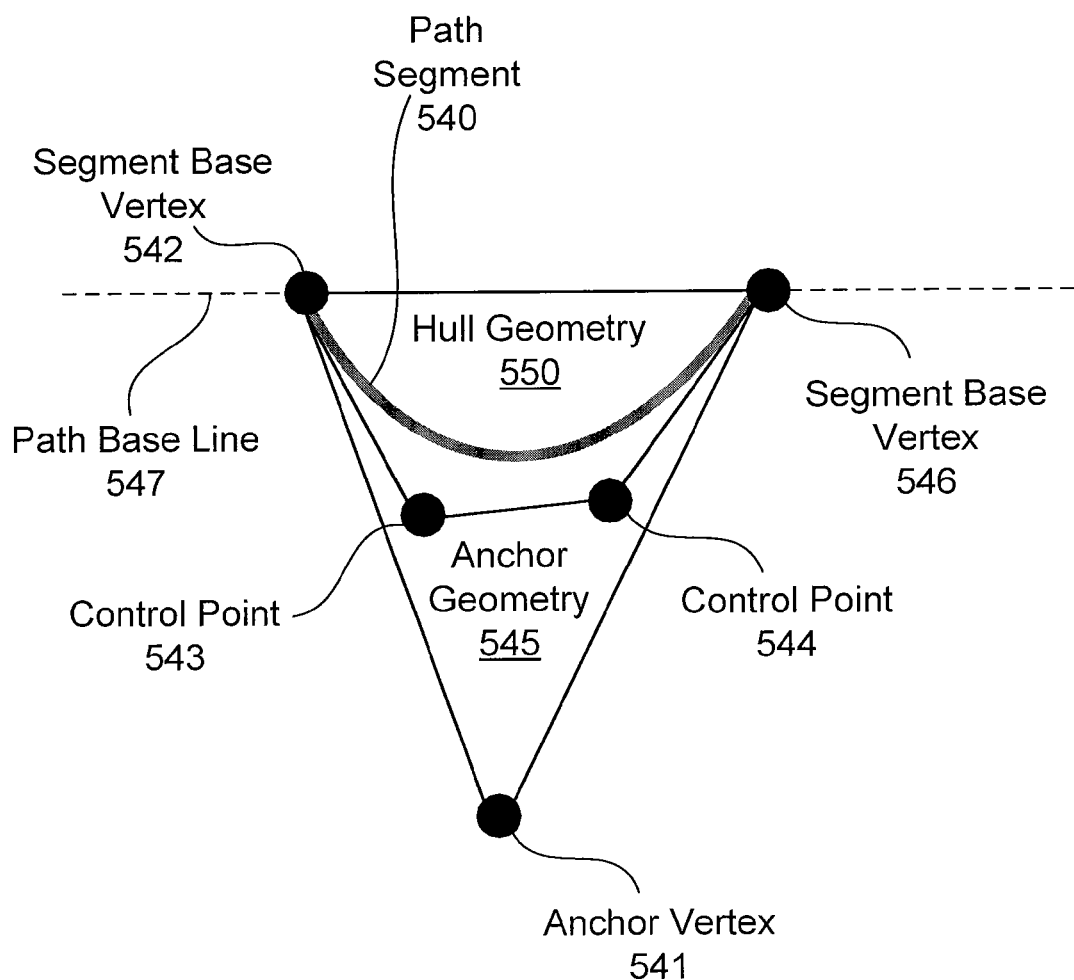

FIG. 5C illustrates another path segment 540 that is also a simple Bèzier cubic path segment, according to one embodiment of the invention. The simple cubic Bèzier path segment 540 starts at a first interpolating control point, segment base vertex 542 and ends at a second interpolating control point, segment base vertex 546. The simple cubic Bèzier path segment 540 has two extrapolating control points, control point 543 and control point 544.

Parameters for the simple cubic Bèzier path segment 540 are generated by linearly interpolating parameters that specify the cubic Bèzier path segment from which the simple cubic Bèzier path segment 540 originated. A polygon, hull geometry 550 is constructed for the simple cubic Bèzier path segment 540 such that each vertex of the hull geometry 550 is coincident with a control point of the simple cubic Bèzier path segment 540. The 4-sided hull geometry 550 is defined by the segment base vertex 542, control point 543, control point 544, and segment base vertex 546.

An anchor vertex 541 is determined for the closed path loop containing the simple cubic Bèzier path segment 540 and anchor geometry 545 with winding order consistent with the path segment 540 is defined by the anchor vertex 541, the segment base vertex 542, and the segment base vertex 546. The winding order of the convex hull geometry 550 is counter-clockwise and the winding order of the anchor geometry 545 is clockwise. Therefore, the stencil buffer is incremented by the front-facing anchor geometry 545 and decremented by the back-facing hull geometry 550 for a net change of zero. However only the top portion of hull geometry 550 above path segment 540 actually decrements the stencil buffer because the region of the hull geometry 550 below the path segment 540 is discarded by the stencil discard shared in this case. Therefore, the pixels within the anchor geometry 545 that are also below path segment 550 are incremented (and not decremented) in the stencil buffer.

Texture coordinates are associated with the vertices of the hull geometry 550 and the texture coordinates are interpolated and used by the discard shader program to determine the pixels of the convex hull geometry 550 that are inside of the path segment 540.

In more detail, the discard shader program then causes the stencil buffer to decrement for the surviving pixels based on the back-facing winding order of the convex hull geometry 550. Stencil-only rendering without a discard shader is then used to render the anchor geometry 545 and, based on the front-facing winding order of the anchor geometry 545, causes the stencil buffer to increment for pixels that are within the anchor geometry 545. The relative effect on the stencil buffer indicates that pixels bounded by the path segment 540 and segments having a common endpoint at the anchor vertex 541 and respective endpoints at the segment base vertex 542 and the segment base vertex 546 are all incremented by one. Once combined with all the path segments in the path, the net result is to displace the stencil buffer from its original value by the winding number of each pixel with respect to the complete path.

Figure 5D:
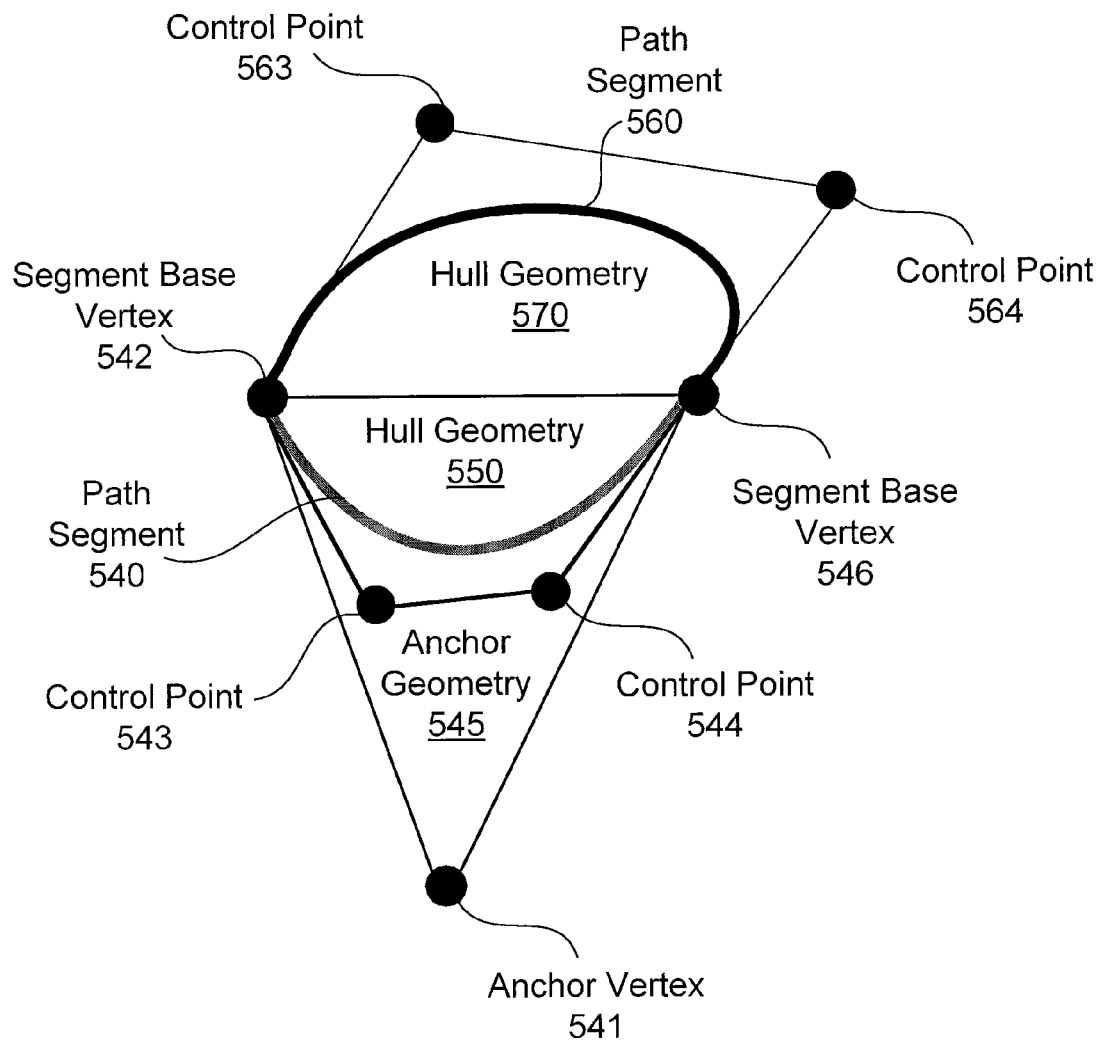

FIG. 5D illustrates the simple Bèzier cubic path segment 540 and a simple Bèzier cubic path segment 560 that form a closed path, according to one embodiment of the invention. The simple cubic Bèzier path segment 560 starts at the segment base vertex 546 and ends at the segment base vertex 542. The simple cubic Bèzier path segment 560 has two extrapolating control points, control point 563 and control point 564. The convex hull geometry 570 is a quadrilateral winding counter-clockwise and defined by the segment base vertex 546, the control point 564, the control point 563, and the segment base vertex 542. The convex hull geometry 550 is also a quadrilateral winding counter-clockwise and defined by the segment base vertex 542, the control point 543, the control points 544, and the segment based vertex 546.

Texture coordinates computed using the technique described by Loop and Blinn are associated with the vertices of the convex hull geometries 550 and 570 and the texture coordinates are interpolated and used by the discard shader program to determine the pixels of the hull geometries 550 and 570 that are inside of the closed path including the path segment 560 and the path segment 540. The discard shader program discards the pixels between the path segment 540 and the edges of the hull geometry 550 starting at the segment base vertex 546, passing through the control point 544 and 543, and ending at the segment base vertex 542. The discard shader program then decrements the stencil buffer for the surviving pixels within the hull geometry 550 and 570 based on the similarly counter-clockwise winding order of the respective hull geometry 550 or 570. Stencil values corresponding to the surviving pixels that are inside of the path formed by the path segments 540 and 560 are decremented by the discard shader program. Importantly, the decrements, as well as any increments, perform modulo or wrapping arithmetic (rather than saturating arithmetic). This is crucial given the limited integer precision (typically 8 bits) of the stencil buffer. In this example, this means if the stencil buffer was initially cleared to zero, the result of these decrements to an 8-bit stencil buffer would be the value 255 resulting from modulo-256 arithmetic.

The treatment so far has ignored the anchor geometry in FIG. 5D. Stencil-only rasterization without discarding is then used to render the anchor geometry 545 and, based on the winding order of the anchor geometry 545, increments or decrements the stencil buffer for pixels that are within the anchor geometry 545. The winding order of the anchor geometry 545 for the path segment 540 is clockwise. The anchor geometry for the path segment 560 is coincident with the anchor geometry 545, but has a counter-clockwise winding order. Therefore, values of the stencil buffer corresponding to pixels in the anchor geometry 545 are incremented and decremented, producing a net stencil change of zero. In one embodiment, if identical anchor geometry except for opposite winding order is detected, rasterization of this geometry can be skipped. Due to the freedom to position the anchor vertex arbitrarily, another embodiment could position anchor vertex 541 coincident with either segment based vertex 542 or 546 resulting in both instances anchor geometry 545 having zero area. An embodiment could eliminate rasterization of any such zero area geometry.

After the hull geometries 550 and 570 and both of the anchor geometries 545 are rendered to generate the stencil buffer, the stencil buffer will indicate only the pixels that are inside of the path defined by the path segments 540 and 560. The generated stencil buffer may then be used to fill the pixels that are inside of the path segment 540, e.g., pixels between the path segment 540 and the segment bounded by the segment base vertex 542 and the segment base vertex 546. A bounding geometry that is a quadrilateral defined by all of the vertices of the path defined by the path segments 540 and 560, e.g., the segment base vertices 542 and 546 and control points 543, 544, 563, and 564, may be rendered to write the color buffer based on the stencil buffer. The bounding geometry should conservatively enclose the path to be filled. Rasterization of the bounding geometry can test the stencil buffer. Assuming the stencil buffer was initially cleared to zero, the stencil test can discard updates to any pixels with a corresponding stencil value of zero, but otherwise update non-zero pixels. In the case of FIG. 5D, the region bounded by path segments 540 and 560 has a resulting stencil value of 255 so this region will be updated. Along with updating the color buffer, this covering rasterization can zero the non-zero stencil values so subsequent paths can be rendered in a similar manner.

Figure 6A:
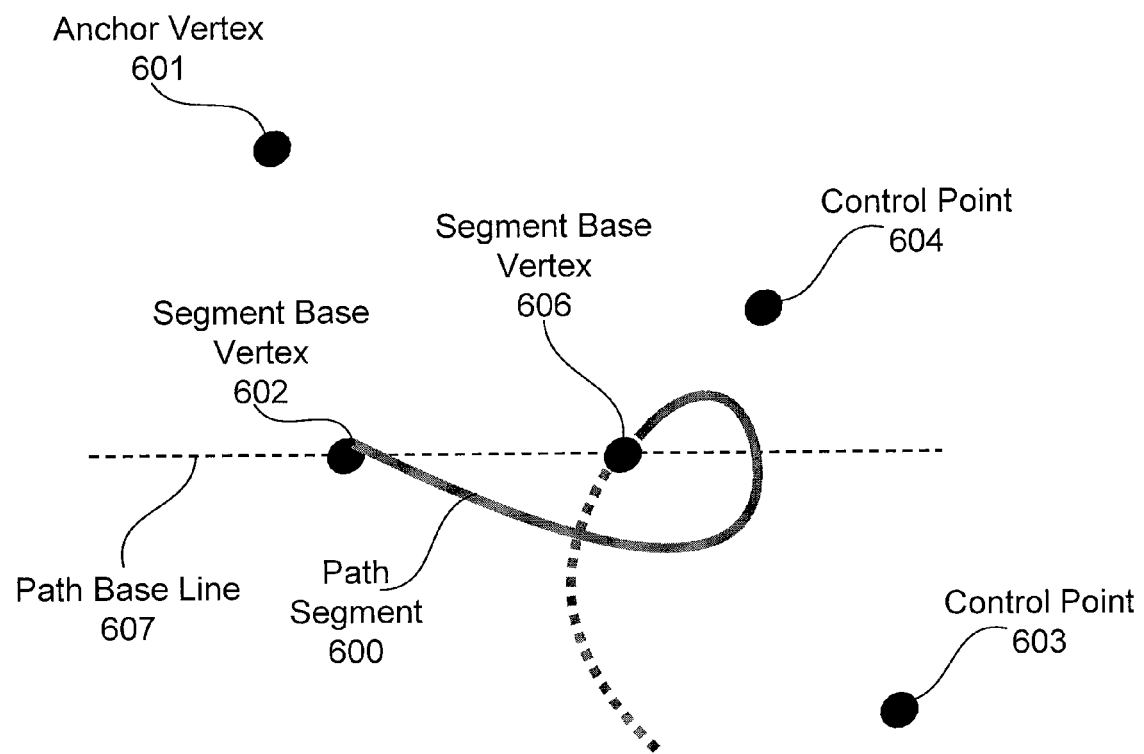
FIGS. 6A and 6B illustrate paths that are Bèzier cubic path segments that are self-intersecting to form a loop with one root, according to one embodiment of the invention.

FIG. 6A illustrates a Bèzier cubic path segment 600 that is self-intersecting to form a loop with one root, according to one embodiment of the invention. The cubic Bèzier path segment 600 starts at a first interpolating control point, segment base vertex 602 and ends at a second interpolating control point, segment base vertex 606. Both of the interpolating control points lie on a path base line 607. The cubic Bèzier path segment 600 has two extrapolating control points, control point 603 and control point 604 and an anchor vertex 601 is positioned outside of the path segment 600. For reasons that will be made clear, a dashed line emanating from segment based vertex 606 shows how the cubic Bèzier curve would continue outside the conventional [0,1] parameter range of a cubic Bèzier segment. The simple process explained so far for FIGS. 5A, 5B, 5C, and 5D is insufficient to handle the situation in FIG. 6A for reasons that are not immediately obvious. The implication is that the conventional techniques that are limited to filling quadratic Bèzier curves will not extend in a straightforward way to the situation in FIG. 6A as well as additional cases to be discussed. The present invention provides a robust way to handle these problem situations while still making use of the efficient-to-evaluate Loop and Blinn cubic curve texture coordinates. A corresponding discard shader is used to generate a stencil buffer.

Figure 6B:
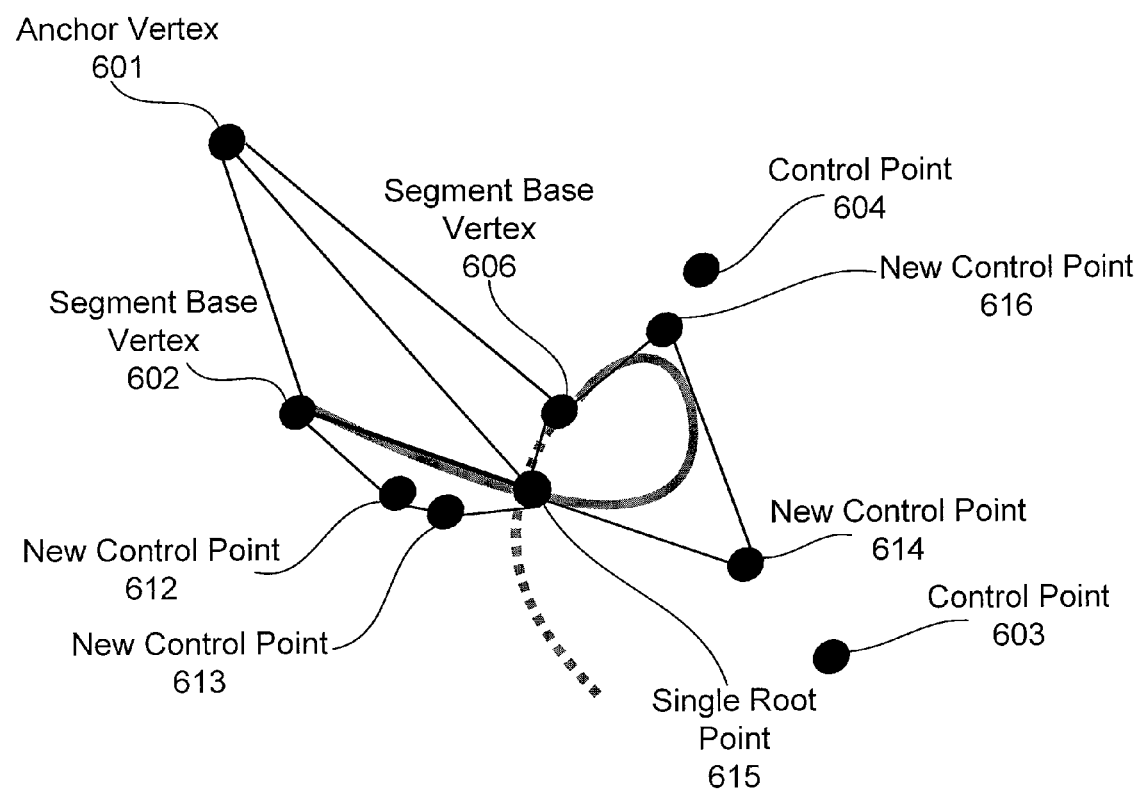

FIG. 6B illustrates the anchor geometry for the simple cubic Bèzier path segments originating from the self-intersecting cubic Bèzier path segment 600, according to one embodiment of the invention. A single root point 615 is located at the position where the path segment 600 intersects the continuation of the cubic Bèzier curve. The path segment 600 has a single intersection root within the [0,1] parametric interval since the endpoints of the parametric interval correspond to the segment base vertex 602 and the segment base vertex 606, and the single root point 615 is approximately located at 0.4 in parametric space. If the path segment 600 continued past the segment base vertex 606, the path segment 600's cubic curve would also self-intersect at approximately 1.2 in parametric space. However, 1.2 is outside of the parametric interval of [0,1] so there is only a single intersection on the path segment 600. A cubic Bèzier path segment with a loop topology and a single root point is divided into two simple cubic Bèzier path segments prior to rendering the path.

A first simple cubic Bèzier path segment is created using the well-known De Casteljau's algorithm for Bèzier curve splitting by starting at the segment base vertex 602 and ending at the single root point 615. The first simple cubic Bèzier path segment has two extrapolating control points, new control point 612 and new control point 613. Convex hull geometry for the first simple cubic Bèzier path segment is defined by the segment base vertex 602, new control point 612, new control point 613, and the single root point 615; this hull winds counter-clockwise. Anchor geometry for the first simple cubic Bèzier path segment is defined by the anchor vertex 601, the segment base vertex 602, and the single root point 615; this hull geometry winds counter-clockwise. The winding of the anchor geometry is the same as the convex hull geometry for the first simple cubic Bèzier path segment.

Again using De Casteljau's algorithm, a second simple cubic Bèzier path segment is created starting at the single root point 615 and ending at the segment base vertex 606. The second simple cubic Bèzier path segment also has two extrapolating control points, new control point 614 and new control point 616. Counter-clockwise winding convex hull geometry for the second simple cubic Bèzier path segment is defined by the single root point 615, new control point 614, new control point 616, and the segment base vertex 606. Anchor geometry for the second cubic Bèzier path segment is defined by the anchor vertex 601, the single root point 615, and the segment base vertex 606. The winding of the anchor geometry is counter-clockwise and the same as the convex hull geometry for the second simple cubic Bèzier path segment.

After this splitting process, the rationale for splitting can be identified. Unlike the single path segment 600 in FIG. 6A where the curve intersects the path base line 607, such crossings are eliminated in each of the two split path segments on either side of single root point 615 in FIG. 6B. The first path segment does not intersect its path base line spanning 602 and 615, and the second path segment does not intersect its path base line spanning 615 and 606. The elimination of path segments crossing their base line is crucial for correct net winding when the complete path is rendered; otherwise an obviously incorrect path determination results.

The convex hull geometries are rendered using the discard shader program and the stencil buffer values are updated for the surviving pixels. The texture coordinates for the convex hull vertices 612, 613, 614, and 616 are efficiently computed by linearly interpolating the Loop and Blinn texture coordinates generated from the original path segment 600's control points. The first and second anchor geometries are processed by the stencil shader and the stencil values are updated based on the winding orders. The resulting stencil buffer when combined with all the other path segments of the complete path indicates the pixels that are inside of the complete filled path. A bounding geometry for the entire path containing path segment 600 may be rendered to write the color buffer based on the stencil buffer, filling a closed path that includes the path segment 600.

Figure 6C:
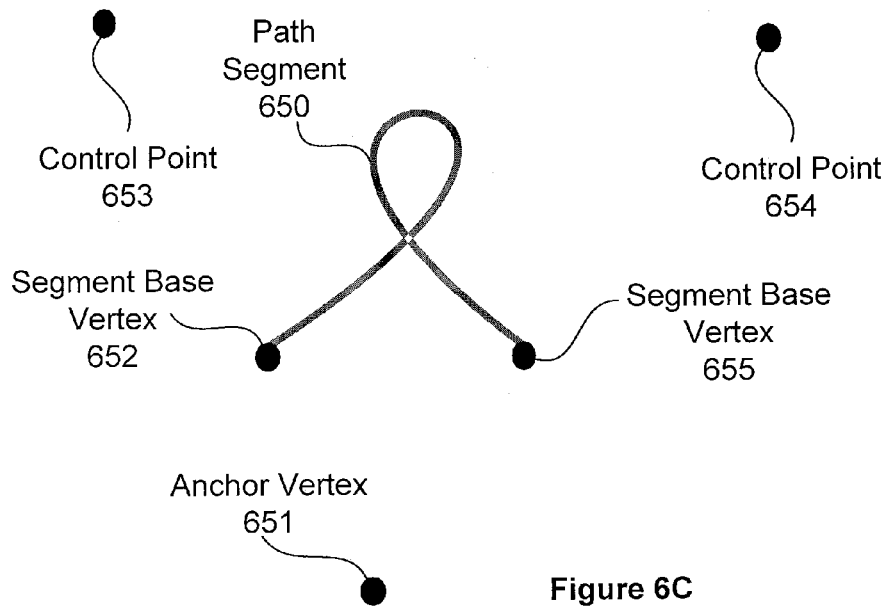
FIGS. 6C and 6D illustrate paths that are Bèzier cubic path segments that are self-intersecting to form a loop with two roots, according to one embodiment of the invention.

FIG. 6C illustrates a Bèzier cubic path segment 650 that is self-intersecting to form a loop with two roots with the parametric interval [0,1], according to one embodiment of the invention. The cubic Bèzier path segment 650 starts at a first interpolating control point, segment base vertex 652 and ends at a second interpolating control point, segment base vertex 655. The cubic Bèzier path segment 650 is defined by two interpolating control points, and control point 653 and 654. An anchor vertex 651 is positioned outside of the path segment 650. Path segment 650 requires splitting because the loop formed by path segment 650 needs to be incremented consistently with the non-loop portion of the path segment.

Figure 6D:
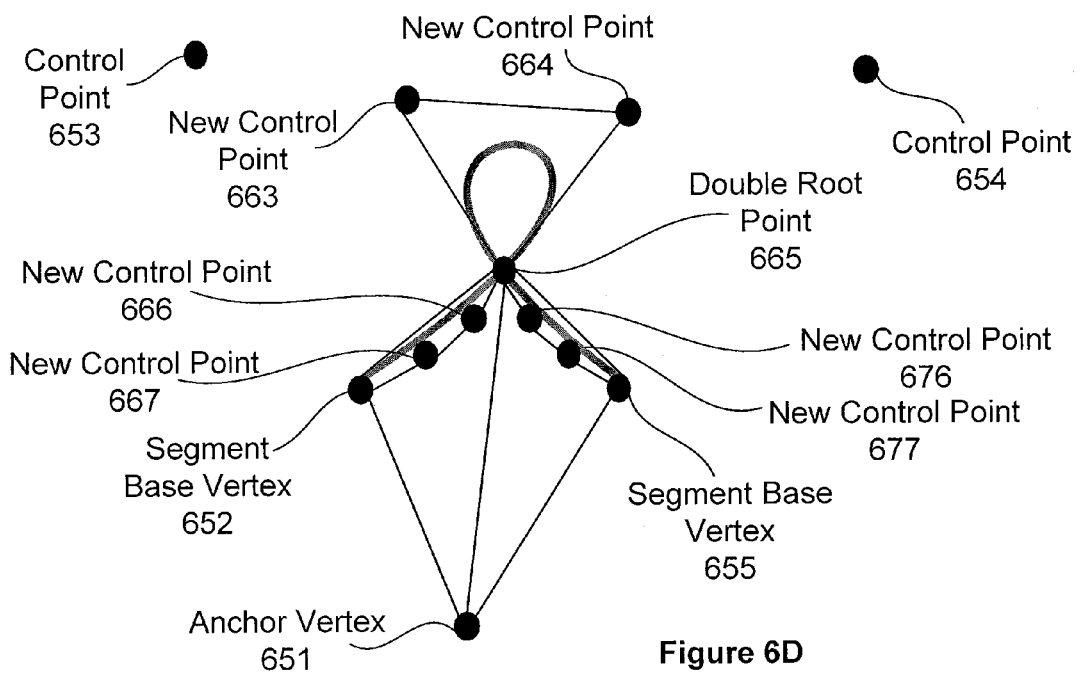

FIG. 6D illustrates the anchor geometry for the simple cubic Bèzier path segments originating from the self-intersecting cubic Bèzier path segment 650, according to one embodiment of the invention. A double root point 665 is located at the position where the path segment 650 intersects itself. The path segment 650 has a double root between the [0,1] parametric interval since there are two points on the path segment 650 between the endpoints of the parametric interval that correspond to the segment base vertex 652 and the segment base vertex 656. A cubic Bèzier path segment with a loop topology and a double root point is divided into three simple cubic Bèzier path segments prior to rendering the path.

A first simple cubic Bèzier path segment is created starting at the segment base vertex 652 and ending at the double root point 665. The first simple cubic Bèzier path segment has two extrapolating control points, new control point 667 and new control point 666. Convex hull geometry winding counter-clockwise for the first simple cubic Bèzier path segment is defined by the segment base vertex 652, new control point 667, new control point 666, and the double root point 665. Anchor geometry winding clockwise for the first simple cubic Bèzier path segment is defined by the anchor vertex 651, the segment base vertex 652, and the double root point 665.

A second simple cubic Bèzier path segment is created starting at the double root point 665 and ending at the double root point 665. The second simple cubic Bèzier path segment also has two extrapolating control points, new control point 663 and new control point 664. Convex hull geometry winding clock-wise for the second simple cubic Bèzier path segment is defined by the double root point 665, new control point 663, new control point 664, and the double root point 665. Anchor geometry for the second cubic Bèzier path segment is degenerate having zero area so need not be rasterized.

A third simple cubic Bèzier path segment is created starting at the double root point 665 and ending at the segment base vertex 655. The third simple cubic Bèzier path segment also has two extrapolating control points, new control point 676 and new control point 677. Convex hull geometry winding counter-clockwise for the third simple cubic Bèzier path segment is defined by the segment base vertex 655, new control point 677, new control point 676, and the double root point 665. Anchor geometry winding clockwise for the third cubic Bèzier path segment is defined by the anchor vertex 651, double root point 665, and the segment base vertex 655.

The hull geometries are rendered using the discard shader program to discard pixels and update the stencil buffer and the first and second anchor geometries are rendered without discarding to update the stencil buffer. As in the single root case, the texture coordinates for the convex hull vertices 667, 666, 663, 664, 676, and 677 are efficiently computed by linearly interpolating texture coordinates generated from the original path segment 650's control points. The resulting stencil buffer after all the other path segments in the path containing path segment 650 are rendered indicates the pixels that are inside the complete path. The stencil buffer is then used to fill a closed path that includes the path segment 650.

Figure 7A:
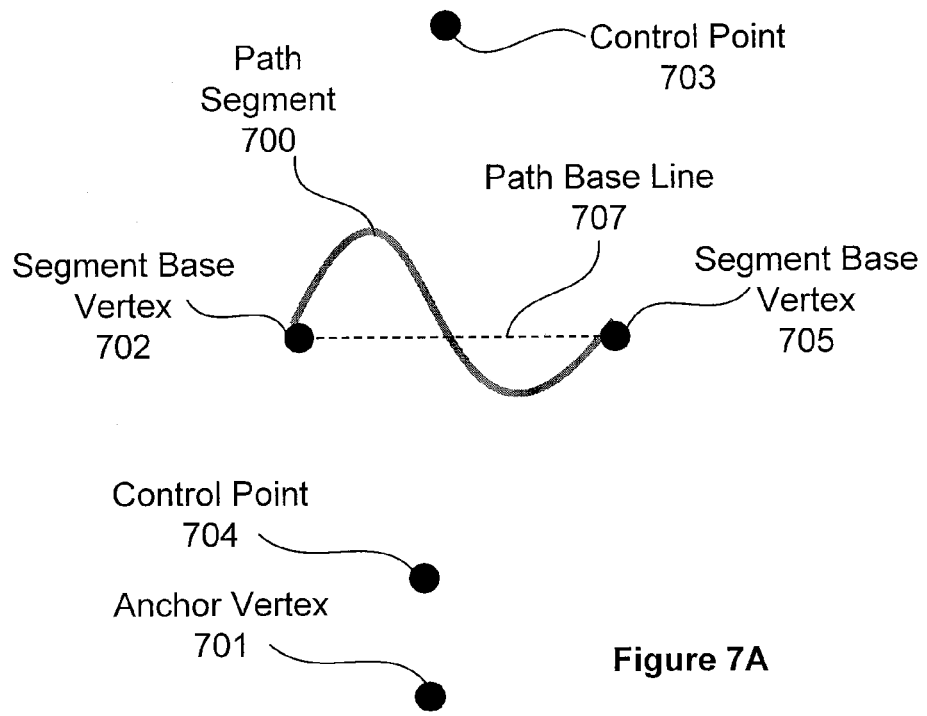
FIGS. 7A and 7B illustrate paths that are Bèzier cubic path segments that intersect a base line to form a serpentine, according to one embodiment of the invention.

FIG. 7A illustrates a cubic Bèzier path segment 700 that intersects a base line to form a serpentine topology, according to one embodiment of the invention. The cubic Bèzier path segment 700 starts at a first interpolating control point, segment base vertex 702 and ends at a second interpolating control point, segment base vertex 705. The cubic Bèzier path segment 700 is defined by two interpolating control points, control point 703 and 704. An anchor vertex 701 is positioned inside of a closed path that includes the path segment 700. The cubic Bèzier path segment 700 intersects the path base line 707 between the segment base vertex 702 and the segment base vertex 705 meaning that a region above the path base line 707 and below path segment 700 should be stencil incremented and the region below the path base line and above path segment 700 should be stencil decremented though this region will also be incremented due to an increment from the anchor geometry winding clockwise. Accomplishing this requires splitting the serpentine path segment.

Figure 7B:
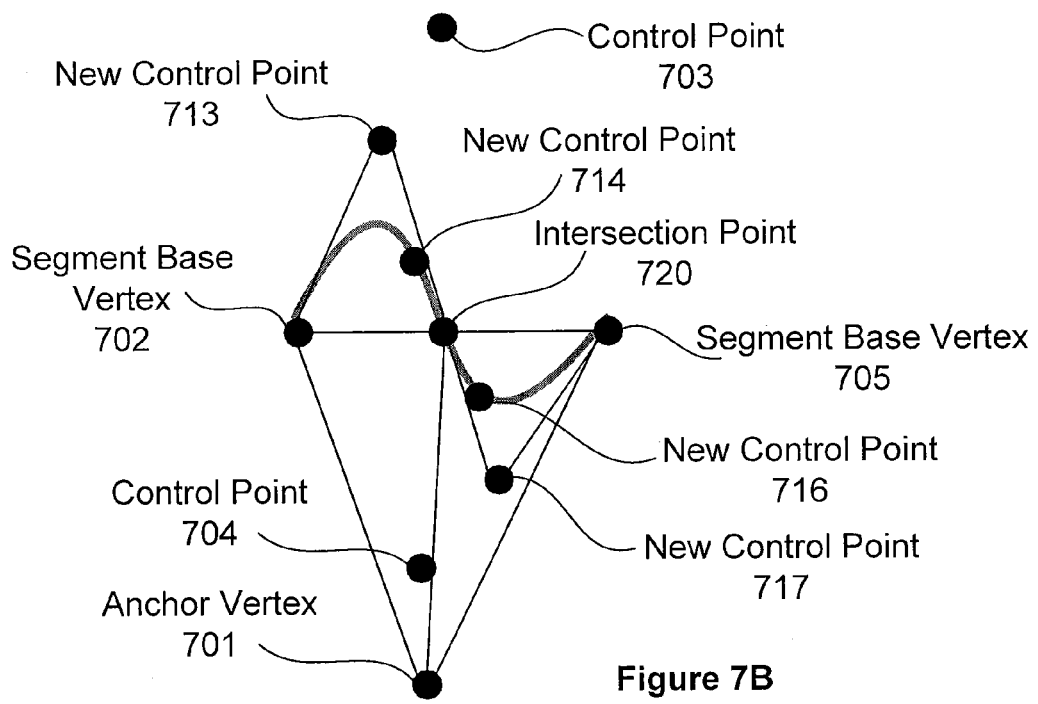

FIG. 7B illustrates simple cubic Bèzier path segments originating from the cubic Bèzier path segment 700 that intersects a base line to form a serpentine topology, according to one embodiment of the invention. An intersection point 720 is located at the position where the path segment 700 intersects the path base line 707. A cubic Bèzier path segment with a serpentine topology is divided into two simple cubic Bèzier path segments prior to rendering the path.

A first simple cubic Bèzier path segment is created starting at the segment base vertex 702 and ending at the intersection point 720. The first simple cubic Bèzier path segment has two extrapolating control points, new control point 713 and new control point 714. Convex hull geometry winding clockwise for the first simple cubic Bèzier path segment is defined by the segment base vertex 702, the new control point 713, and the intersection point 720. Anchor geometry winding clockwise for the first simple cubic Bèzier path segment is defined by the anchor vertex 701, the segment base vertex 702, and the intersection point 720. The winding of the anchor geometry is the same as the convex hull geometry for the first simple cubic Bèzier path segment.

A second simple cubic Bèzier path segment is created starting at the intersection point 720 and ending at the segment base vertex 705. The second simple cubic Bèzier path segment has two extrapolating control points, new control point 717 and new control point 716. Counter-clockwise winding convex hull geometry for the second simple cubic Bèzier path segment is defined by the segment base vertex 705, the intersection point 720, and the new control point 717. Clockwise winding anchor geometry for the second simple cubic Bèzier path segment is defined by the anchor vertex 701, the intersection point 720, and the segment base vertex 705. The winding of the anchor geometry is the reverse of the convex hull geometry for the second simple cubic Bèzier path segment.

The hull geometries are rendered using the discard shader program to discard pixels and update the stencil buffer and the first and second anchor geometries are rendered without discarding to update the stencil buffer. As in the prior loop cases, the texture coordinates for the convex hull vertices 713 and 717 are efficiently computed by linearly interpolating the texture coordinates generated from the original path segment 650's control points. The resulting stencil buffer increments the pixels that are inside of the first cubic Bèzier path segment and decrements the stencils inside the second simple cubic Bèzier path segment. The stencil buffer is then used to fill the complete closed path that includes the path segment 700. The pixels between the portion of the path segment 700 within the first convex hull geometry will be incremented and the portion of the path segment 700 within the second convex hull geometry will decremented but canceled by the increment from the anchor geometry.

A cubic Bèzier path segment may also form a cusp topology that is detected when the cubic Bèzier discriminate is exactly zero. A cubic Bèzier path segment that forms a cusp topology may be divided into simple cubic Bèzier path segment in the same manner as a serpentine topology. There are also degenerate fill cases for which an area should be discarded and not filled. For Example points should not be filed. Line segments should be handled as a line segment or using a generic degenerate (s,t) texture coordinate assignment. Quadratic Bèzier segments should be handled directly as quadratic Bèzier segments or using a generic degenerate (s,t,r) texture coordinate assignment.

For numeric precision reasons, cubic Bèzier segments that are masquerading as quadratic Bèzier segments, or that may be represented as a quadratic Bèzier segment, should be demoted and handled as a quadratic Bèzier segment. A cusp at infinity should be processed using a special degenerate (s,t,r) texture coordinate assignment. A person skilled in the art will recognize that this discussion exhaustively, robustly, and efficiently handles all the cases necessary to decompose arbitrary cubic Bèzier segments into simple cubic Bèzier segments such that when rendered as described with the complete set of path segments, the present invention can determine via a stencil buffer the pixels belong to the filled region of an arbitrary path consisting of cubic and quadratic Bèzier curves and other path segment types such as partial elliptical arcs and line segments. This process is free from tessellation of the path.

Figure 8A:
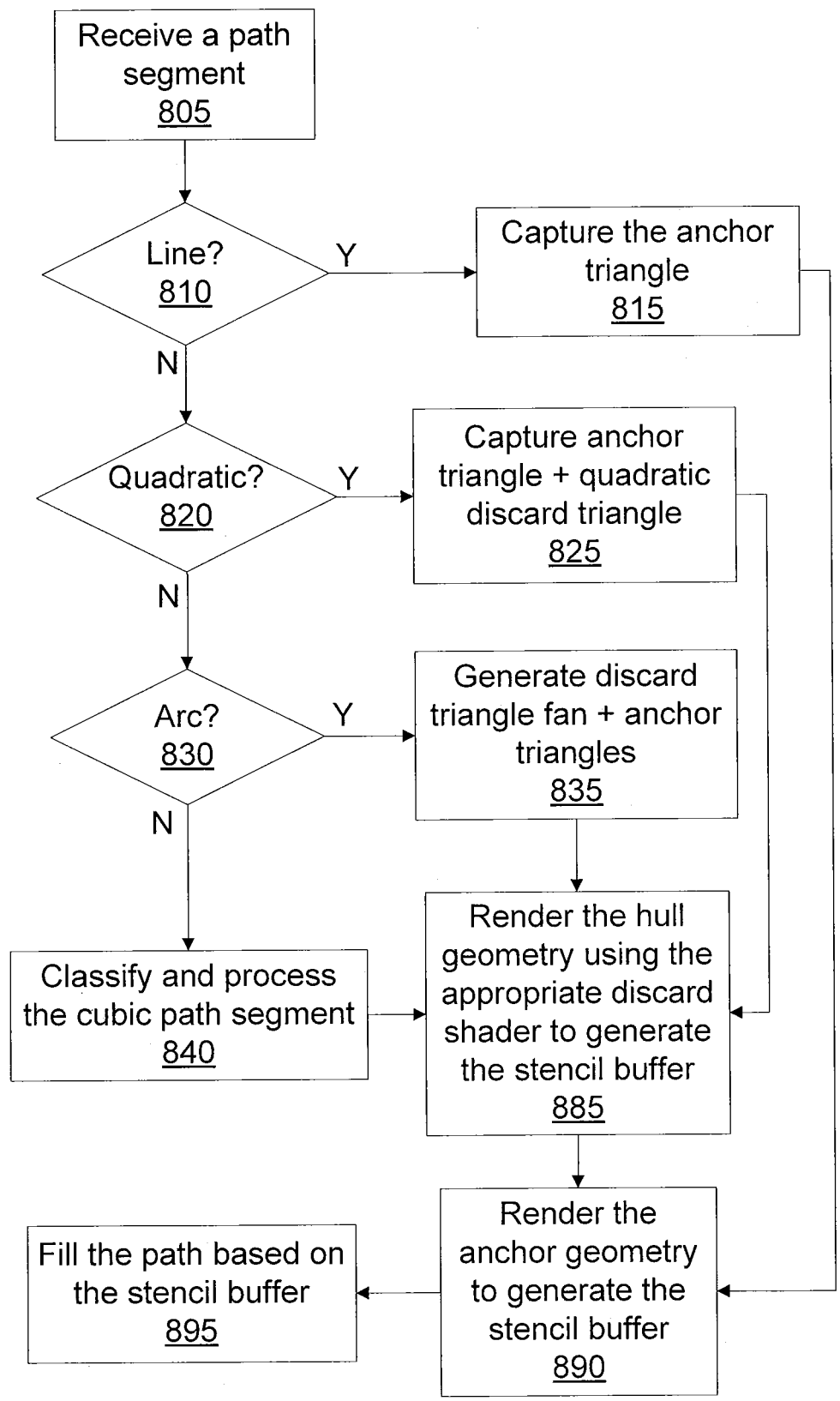
FIG. 8A is a flow diagram of method steps for decomposing cubic Bèzier segments for tessellation-free stencil filling, according to one embodiment of the present invention.

FIG. 8A is a flow diagram of method steps for decomposing cubic Bèzier segments into simple cubic Bèzier path segments for tessellation-free stencil filling, according to one embodiment of the present invention. Although the method steps are described in conjunction with the systems of FIGS. 2A, 2B, 3A, 3B, 3C, and 4, persons skilled in the art will understand that any system configured to perform the method steps, in any order, is within the scope of the inventions. The CPU 102 or parallel processing subsystem 112 may be configured to decompose cubic Bèzier path segments into simple cubic Bèzier segments without tessellation.

At step 805 a path segment is received by a path fill engine. The path fill engine may be embodied as an application program, driver program, or as circuitry configured to perform the method steps shown in FIG. 8A. At step 810 the path fill engine determines if the path segment is a line, and, if so at step 815 the anchor triangle is captured before proceeding to step 890. Otherwise, at step 820 the path fill engine determines if the path segment is a quadratic Bèzier path segment, and, if so at step 825 the anchor triangle and the quadratic discard triangle is captured before proceeding to step 885.

At step 830 the path fill engine determines if the path segment is an arc, and, if so at step 835 a discard triangle fan and anchor triangles are generated by the path fill engine before proceeding to step 885. Otherwise, the path segment is a cubic Bèzier path segment, and at step 840 the cubic Bèzier path segment is classified based on the topology and processed, as described in conjunction with FIG. 8B. At step 885 a discard shader program is executed to render the hull geometry, discarding pixels that are not inside of the path segment and updating the stencil buffer. Different discard shaders are used for the different path segment types, e.g., arcs, quadratic Bèzier, cubic Bèzier, and the like. At step 890 a stencil shader program is executed to render the anchor geometry to complete generation of the stencil buffer. At step 895 the path segment is filled based on the stencil buffer by rendering the bounding geometry with writes to the color buffer enabled. The stencil buffer may be reset or cleared to its state prior to rendering the stenciled geometry using the stencil operation during the final fill covering step.

Figure 8B:
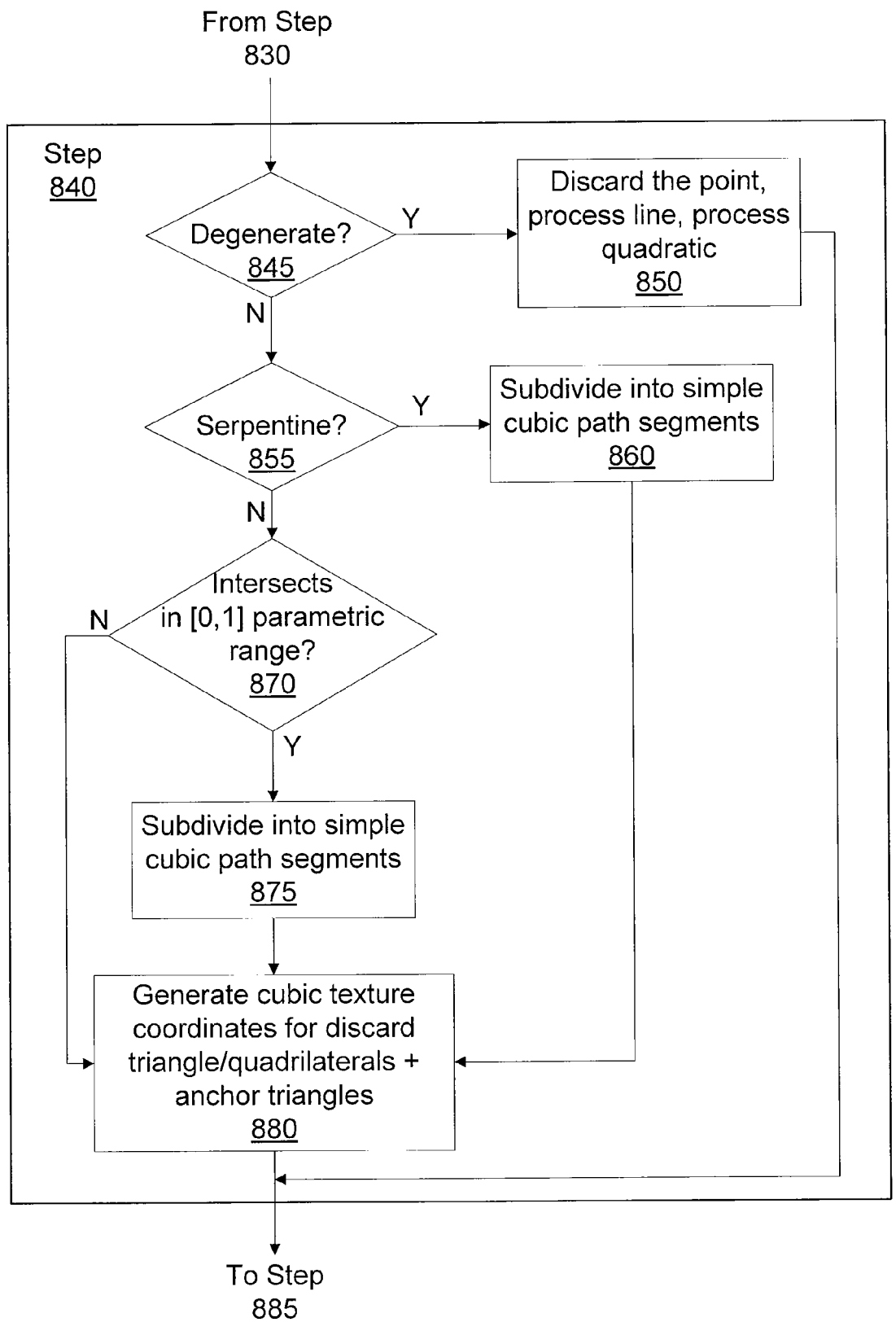
FIG. 8B is a flow diagram of method steps for classifying and processing a cubic path segment as performed in a method step shown in FIG. 8A, according to one embodiment of the present invention.

FIG. 8B is a flow diagram of method steps for classifying and processing a cubic path segment as performed in a method step 840 shown in FIG. 8A, according to one embodiment of the present invention. At step 845 the path fill engine determines if the cubic Bèzier path segment is degenerate, and, if so at step 850 a degenerate point is discarded, a degenerate line is processed as a line, and a degenerate quadratic is processed as a quadratic Bèzier path segment.

At step 855 the path fill engine determines if the cubic Bèzier path segment has a serpentine (or cusp) topology, and, if so at step 860 the path fill engine subdivides the cubic Bèzier path segment into two simple cubic Bèzier path segments. At step 880 the path fill engine generates cubic Bèzier texture coordinates for discard triangles or quadrilaterals and generates cubic Bèzier texture coordinates for anchor triangles.

If at step 855 the path fill engine determines that the cubic Bèzier path segment does not have a serpentine topology, then the cubic Bèzier path segment has a loop topology. A loop topology self-intersects may have either a single root point or a double root point, depending on whether there are one or two intersections in the [0,1] parametric range of the cubic Bèzier path segment. At step 870 the path fill engine determines if the cubic Bèzier path segment self intersects within the [0,1] parametric range, and, if so then at step 875 the path fill engine subdivides the cubic Bèzier path segment into two or three simple cubic Bèzier path segments before proceeding to step 880. If at step 870 the path fill engine determines that the cubic Bèzier path segment does not self-intersect within the [0,1] parametric range, then the path fill engine proceeds directly to step 880 since the cubic Bèzier path segment is a simple cubic Bèzier path segment.

The geometry set of simple Bèzier cubic segments resulting from dividing Bèzier cubic segments is resolution-independent meaning that the filled path can be rasterized under arbitrary projective transformations without needing to revisit the construction of the geometry set. This resolution-independent property is unlike geometry sets built through a process of tessellating curved regions into triangles; in such circumstances, sufficient magnification of the filled path would reveal the tessellated underlying nature of such a tessellated geometry set. The simple Bèzier cubic segments are also compact meaning that the number of bytes required to represent the filled path is linear with the number of path segments in the original path. This property does not generally hold for tessellated versions of filled paths where the process of subdividing curved edges and introducing tessellated triangles typically increases the size of the resulting geometry set considerably.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of decomposing cubic Bèzier path segments, the method comprising:
   receiving a path including a cubic Bèzier path segment;
   subdividing the cubic Bèzier path segment into simple cubic Bèzier path segments when the cubic Bèzier path segment is classified as having a serpentine or loop topology;
   assigning first texture map coordinates to vertices of the simple cubic Bèzier path segments that define a convex hull geometry;
   assigning second texture map coordinates to a plurality of pixels included within the convex hull geometry by interpolating the first texture map coordinates; and
   generating a stencil buffer indicating pixels that are inside of the cubic Bèzier path segment by executing a function on each pixel included in the plurality of pixels, wherein the second texture map coordinates are inputs into the function.

2. The method of claim 1, wherein the generating of the stencil buffer comprises processing an anchor geometry that is defined by an anchor point and a start vertex and an end vertex of a first simple cubic Bèzier path segment of the simple cubic Bèzier path segments.

3. The method of claim 2, wherein the generating of the stencil buffer comprises incrementing values of the stencil buffer corresponding to pixels covered by the anchor geometry when the anchor geometry is front-facing and decrementing the values of the stencil buffer corresponding to the pixels covered by the anchor geometry when the anchor geometry is back-facing.

4. The method of claim 1, wherein the generating of the stencil buffer comprises discarding pixels covered by the convex hull geometry based on the function of the second texture map coordinates.

5. The method of claim 4, wherein the generating of the stencil buffer comprises incrementing values of the stencil buffer corresponding to surviving pixels covered by the convex hull geometry when the convex hull geometry is front-facing and decrementing the values of the stencil buffer corresponding to the surviving pixels covered by the convex hull geometry when the convex hull geometry is back-facing.

6. The method of claim 1, further comprising replacing a degenerate cubic Bèzier path segment of the path with a quadratic Bèzier path segment, a line segment, or a point.

7. The method of claim 1, wherein the generating of the stencil buffer comprises disabling writes to a depth buffer and a color buffer.

8. The method of claim 1, further comprising:
   constructing a bounding geometry that encloses the path; and
   rendering the bounding geometry and writing the color buffer based on the stencil buffer to fill pixels that are inside of the path.

9. The method of claim 1, wherein the subdividing of the cubic Bèzier path segment comprises dividing the cubic Bèzier path segment having a loop topology into a first simple cubic Bèzier path segment and a second simple cubic Bèzier path segment at a root point.

10. The method of claim 1, wherein the subdividing of the cubic Bèzier path segment comprises dividing the cubic Bèzier path segment having a serpentine topology into a first simple cubic Bèzier path segment and a second simple cubic Bèzier path segment at an intersection point of the cubic Bèzier path segment and a base segment between a start vertex and an end vertex of the cubic Bèzier path segment.

11. A non-transitory computer-readable storage medium storing instructions that, when executed by a processor, cause the processor to decompose cubic Bèzier path segments, by performing the steps of:
   receiving a path including a cubic Bèzier path segment;
   subdividing the cubic Bèzier path segment into simple cubic Bèzier path segments when the cubic Bèzier path segment is classified as having a serpentine or loop topology;
   assigning first texture map coordinates to vertices of the simple cubic Bèzier path segments that define a convex hull geometry;
   assigning second texture map coordinates to a plurality of pixels included within the convex hull geometry by interpolating the first texture map coordinates; and
   generating a stencil buffer indicating pixels that are inside of the cubic Bèzier path segment by executing a function on each pixel included in the plurality of pixels, wherein the second texture map coordinates are inputs into the function.

12. The non-transitory computer-readable storage medium of claim 11, wherein the generating of the stencil buffer comprises processing an anchor geometry that is defined by an anchor point and a start vertex and an end vertex of a first simple cubic Bèzier path segment of the simple cubic Bèzier path segments.

13. The non-transitory computer-readable storage medium of claim 12, wherein the generating of the stencil buffer comprises incrementing values of the stencil buffer corresponding to pixels covered by the anchor geometry when the anchor geometry is front-facing and decrementing the values of the stencil buffer corresponding to the pixels covered by the anchor geometry when the anchor geometry is back-facing.

14. The non-transitory computer-readable storage medium of claim 11, wherein the generating of the stencil buffer comprises discarding pixels covered by the convex hull geometry based on the function of the second texture map coordinates.

15. The non-transitory computer-readable storage medium of claim 14, wherein the generating of the stencil buffer comprises incrementing values of the stencil buffer corresponding to surviving pixels covered by the convex hull geometry when the convex hull geometry is front-facing and decrementing the values of the stencil buffer corresponding to the surviving pixels covered by the convex hull geometry when the convex hull geometry is back-facing.

16. The non-transitory computer-readable storage medium of claim 11, further comprising replacing a degenerate cubic Bèzier path segment of the path with a quadratic Bèzier path segment, a line segment, or a point.

17. The non-transitory computer-readable storage medium of claim 11, further comprising:
constructing a bounding geometry that encloses the path; and
rendering the bounding geometry and writing the color buffer based on the stencil buffer to fill pixels that are inside of the path.

18. The non-transitory computer-readable storage medium of claim 11, wherein the subdividing of the cubic Bèzier path segment comprises dividing the cubic Bèzier path segment having a loop topology into a first simple cubic Bèzier path segment and a second simple cubic Bèzier path segment at a root point.

19. The non-transitory computer-readable storage medium of claim 11, wherein the subdividing of the cubic Bèzier path segment comprises dividing the cubic Bèzier path segment having a serpentine topology into a first simple cubic Bèzier path segment and a second simple cubic Bèzier path segment at an intersection point of the cubic Bèzier path segment and a base segment between a start vertex and an end vertex of the cubic Bèzier path segment.

20. A system for decomposing cubic Bèzier path segments, the system comprising:
a memory that is configured to store a stencil buffer; and
a processor that is coupled to the memory and configured to:
receive a path including a cubic Bèzier path segment;
subdivide the cubic Bèzier path segment into simple cubic Bèzier path segments when the cubic Bèzier path segment is classified as having a serpentine or loop topology;
assign first texture map coordinates to vertices of the simple cubic Bèzier path segments that define a convex hull geometry;
assign second texture map coordinates to a plurality of pixels included within the convex hull geometry by interpolating the first texture map coordinates; and
write values to the stencil buffer indicating pixels that are inside of the cubic Bèzier path segment by executing a function on each pixel included in the plurality of pixels, wherein the second texture map coordinates are inputs into the function.

* * * * *